(12) United States Patent
Oguchi et al.

(10) Patent No.: US 7,477,640 B2
(45) Date of Patent: Jan. 13, 2009

(54) PACKET PROCESSING SYSTEM

(75) Inventors: Naoki Oguchi, Kawasaki (JP); Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 572 days.

(21) Appl. No.: 10/972,862

(22) Filed: Oct. 25, 2004

(65) Prior Publication Data

US 2005/0220124 A1 Oct. 6, 2005

(30) Foreign Application Priority Data

Mar. 31, 2004 (JP) .............................. 2004-105973

(51) Int. Cl.
*H04L 12/28* (2006.01)
*H04L 12/56* (2006.01)
*G06F 15/16* (2006.01)

(52) U.S. Cl. ...................... 370/389; 709/227; 370/392; 370/401; 370/402

(58) Field of Classification Search .................. 370/400
See application file for complete search history.

(56) References Cited

U.S. PATENT DOCUMENTS

| 4,893,307 | A | 1/1990 | McKay et al. |
| 5,021,949 | A | 6/1991 | Morten et al. |
| 7,003,574 | B1 * | 2/2006 | Bahl ........................... 709/228 |
| 2002/0143953 | A1 * | 10/2002 | Aiken, Jr. .................... 709/227 |
| 2003/0016624 | A1 * | 1/2003 | Bare .......................... 370/217 |
| 2003/0091020 | A1 * | 5/2003 | Bantukul et al. ............ 370/349 |

FOREIGN PATENT DOCUMENTS

| JP | 02-009247 | 1/1990 |
| JP | 6-66813 | 8/1994 |

OTHER PUBLICATIONS

Gilad Goren. P1520 Reference Model. Documents, Foils, and Minutes of the Fifth WG Meeting. Jan. 1999.
Essence of Load Balancer (1) http://www.atmarkit.co.jp/fnetwork/rensai/b01/1b01.html.

* cited by examiner

*Primary Examiner*—Hassan Kizou
*Assistant Examiner*—Andrew Chriss
(74) *Attorney, Agent, or Firm*—Katten Muchin Rosenman LLP

(57) ABSTRACT

A packet processing system including a forwarding apparatus that sends and receives a packet by using a network interface and a control apparatus that includes an application receiving the packet is provided. The control apparatus includes: a symbol part corresponding to the forwarding apparatus; and a transfer control part for sending a request message, to the forwarding apparatus, requesting the forwarding apparatus to set a packet transfer rule for transferring a receiving packet to the application; and the forwarding apparatus includes: a transfer control part for setting the packet transfer rule as requested by the request message; wherein the packet transfer rule includes an interface identifier corresponding to the communication port; and when the control apparatus detects that the interface identifier is changed, the control apparatus sends a correction message, to the forwarding apparatus, requesting the forwarding apparatus to correct the interface identifier in the packet transfer rule.

20 Claims, 27 Drawing Sheets

FIG.2

| CONTROL APPARATUS ADDRESS | 192.168.250.3 |
|---|---|
| VIRTUAL IF | veth1 |
| REAL IF | eth1 |

FIG.3

| CONTROL APPARATUS ADDRESS | 192.168.240.1 |
|---|---|
| VIRTUAL IF | veth1 |
| REAL IF | eth1 |
| DOWNWARD TUNNEL ID | 250 |

FIG.4

| MESSAGE TYPE | 0 (TRANSFER REQUEST=0, TRANSFER REQUEST RESPONSE=1, CORRECTION REQUEST=2, CORRECTION REQUEST RESPONSE=3) |
|---|---|
| SIGNALING IDENTIFIER | 0 |
| CONTROL APPARATUS ADDRESS | 192.168.250.3 |
| PORT NUMBER | 80 |
| VIRTUAL IF | veth1 |
| UPWARD TUNNEL ID | 150 |

FIG.5

| UPWARD TUNNEL ID | RECEIVE VIRTUAL IF | SIGNALING IDENTIFIER |
|---|---|---|
| 150 | veth1 | 50000 |

FIG.6

| SEND VIRTUAL IF | DOWNWARD TUNNEL ID | FORWARDING APPARATUS ADDRESS |
|---|---|---|
| veth1 | 250 | 192.168.240.1 |

FIG.7

| RECEIVE IF | DESTINATION TCP/UDP PORT NUMBER | UPWARD TUNNEL ID | DESTINATION CONTROL APPARATUS ADDRESS | SIGNALING IDENTIFIER |
|---|---|---|---|---|
| eth1 | 80 | 150 | 192.168.250.3 | 50000 |

FIG.8

| DOWNWARD TUNNEL ID | SEND IF |
|---|---|
| 250 | eth1 |

FIG.9

| PORT NUMBER | USAGE STATUS IN USE=1, NOT IN USE =0 | PORT NUMBER USING CONTROL APPARATUS ADDRESS | PORT NUMBER USING PROCESS NUMBER |
|---|---|---|---|
| 32768 | 1 | 192.168.250.3 | |
| 32769 | 1 | 192.168.250.3 | 8080 |
| 32770 | 0 | 0 | 0 |
| ... | 0 | 0 | 0 |
| 60000 | 0 | 0 | 0 |

EPHEMERAL PORT USABLE RANGE IS 32768-60000

FIG.10

| MESSAGE TYPE | 4 (ISSUING REQUEST MESSAGE=4, ISSUING RESPONSE MESSAGE=5) |
|---|---|
| CONTROL APPARATUS ADDRESS | 192.168.250.3 |
| PROCESS ID | 8080 |
| PORT NUMBER | 0 |

FIG.11

| MESSAGE TYPE | 5 (ISSUING REQUEST MESSAGE=4, ISSUING RESPONSE MESSAGE=5) |
|---|---|
| CONTROL APPARATUS ADDRESS | 192.168.250.3 |
| PROCESS ID | 8080 |
| PORT NUMBER | 0 |

FIG.14

| MESSAGE TYPE | 0 | (TRANSFER REQUEST=0, TRANSFER REQUEST RESPONSE=1, CORRECTION REQUEST=2, CORRECTION REQUEST RESPONSE=3) |
|---|---|---|
| SIGNALING IDENTIFIER | 0 | |
| CONTROL APPARATUS ADDRESS | 192.168.250.3 | |
| PORT NUMBER | 80 | |
| VIRTUAL IF | 0 | |
| UPWARD TUNNEL ID | 150 | |

FIG.15

| MESSAGE TYPE | 1 | (TRANSFER REQUEST=0, TRANSFER REQUEST RESPONSE=1, CORRECTION REQUEST=2, CORRECTION REQUEST RESPONSE=3) |
|---|---|---|
| SIGNALING IDENTIFIER | 50000 | |
| CONTROL APPARATUS ADDRESS | 192.168.250.3 | |
| PORT NUMBER | 80 | |
| VIRTUAL IF | veth1 | |
| UPWARD TUNNEL ID | 150 | |

FIG.16

| MESSAGE TYPE | 2 (TRANSFER REQUEST=0, TRANSFER REQUEST RESPONSE=1, CORRECTION REQUEST=2, CORRECTION REQUEST RESPONSE=3) |
|---|---|
| SIGNALING IDENTIFIER | 50000 |
| CONTROL APPARATUS ADDRESS | 192.168.250.3 |
| PORT NUMBER | 80 |
| VIRTUAL IF | veth1 |
| UPWARD TUNNEL ID | 150 |

FIG.17

| MESSAGE TYPE | 3 (TRANSFER REQUEST=0, TRANSFER REQUEST RESPONSE=1, CORRECTION REQUEST=2, CORRECTION REQUEST RESPONSE=3) |
|---|---|
| SIGNALING IDENTIFIER | 50000 |
| CONTROL APPARATUS ADDRESS | 192.168.250.3 |
| PORT NUMBER | 32769 |
| VIRTUAL IF | veth1 |
| UPWARD TUNNEL ID | 150 |

FIG.21

| DESTINATION IP ADDRESS | DESTINATION TCP/UDP PORT NUMBER | VIRTUAL IP ADDRESS | SIGNALING IDENTIFIER |
|---|---|---|---|
| 192.168.250.3 | 80 | 10.20.30.100 | 50000 |

FIG.22

| VIRTUAL IP ADDRESS | SOURCE IP ADDRESS |
|---|---|
| 10.20.30.100 | 192.168.250.3 |

FIG.23

| RECEIVE IF | DESTINATION TCP/UDP PORT NUMBER | DESTINATION CONTROL APPARATUS ADDRESS |
|---|---|---|
| eth1 | 80 | 192.168.250.3 |

FIG.24

| SENDING SOURCE IP ADDRESS | VIRTUAL IP ADDRESS |
|---|---|
| 192.168.250.3 | 10.25.30.100 |

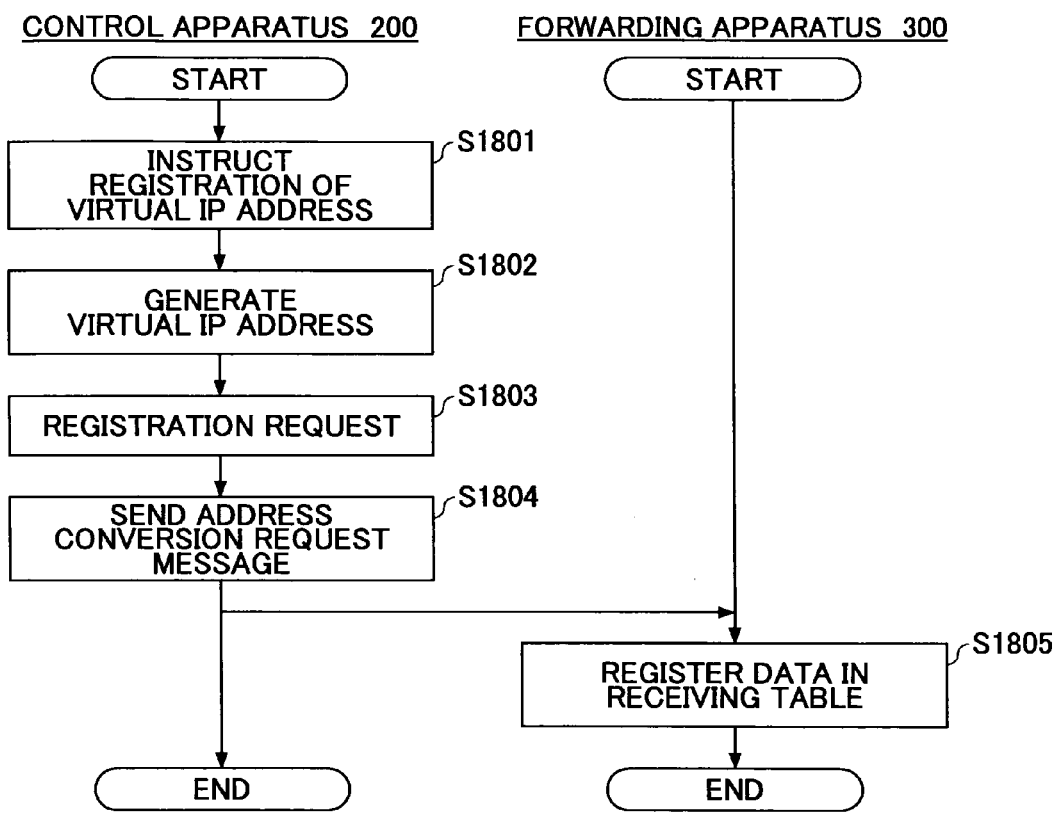

FIG.28

| | |
|---|---|
| MESSAGE TYPE | 0 |
| SIGNALING IDENTIFIER | 0 |
| CONTROL APPARATUS ADDRESS | 192.168.250.3 |
| DESTINATION TCP/UDP PORT NUMBER | 80 |
| VIRTUAL IP ADDRESS | 10.25.30.100 |
| RECEIVE IP ADDRESS | 192.168.250.3 |

PACKET PROCESSING SYSTEM

CROSS-REFERENCE TO RELATED APPLICATIONS

The present application claims priority under 35 U.S.C. § 119 from Japanese Patent Application No. 2004-105973 filed on Mar. 31, 2004, the contents of which are incorporated herein by reference.

BACKGROUND OF THE INVENTION

1. Field of the Invention

The present invention relates to a packet processing system in which a forwarding apparatus and a control apparatus are separated. More particularly, the present invention relates to a packet processing system wherein the control apparatus can dynamically set a packet transfer rule when a new application is launched on the control apparatus so that the forwarding apparatus and the control apparatus can be separated without repairing existing programs.

2. Description of the Related Art

In recent years, with the advance of the Internet, the size of the network is becoming larger, the speed of the network is becoming higher, and service requirements are being diversified, so that requirements for control throughput and information processing resources necessary for the control throughput are rapidly increasing for communication apparatuses. Against this backdrop, there has been an effort to separate a communication apparatus into a control apparatus and a forwarding apparatus and to provide a control apparatus consistent with requirements for the rapidly increasing information processing resources.

A document 1 (P1520 Reference Model [Gilad Goren] (doc), Documents, Foils and Minutes of the Fifth WG Meeting, held in Princeton (Jan 18-19, 1999), in <URL:http://www.ieee-pin.org/> on Apr. 16, 2003) discloses interface definitions between a relay function and a control function of a communication apparatus for integrating networks, that are studied by P1520WG of IEEE. A document 2 (Uetani, Konno, "Serialization, Essence of load balancer, First: understanding basic of load distribution from packet flow" Master of IP Network forum, in <URL: http://www.atmarkit.co.jp/fnetwork/rensai/index/index-serial.html#lb/on May 20, 2003) discloses a prior art in which a forwarding apparatus receives a service request from a network node, and distributes the service request to an optimum control apparatus on the basis of a predetermined packet transfer rule between the forwarding apparatus and the control apparatus.

However, according to the conventional technique in the document 1, there remains a problem that occurs when the forwarding apparatus and the control apparatus are separated.

For example, in the conventional technology disclosed in the document 2, the service request can be distributed to the optimum control apparatus on the basis of the predetermined service transfer rule. However, since the control apparatus cannot set the packet transfer rule when a new application is launched in the control apparatus, there is a problem in that existing applications should be modified or the packet transfer rule should be set manually.

SUMMARY OF THE INVENTION

An object of the present invention is to provide a packet processing system that can dynamically set the packet transfer rule between the control apparatus and the forwarding apparatus even when a new application is launched on the control apparatus so that the forwarding apparatus and the control apparatus can be separated without modifying existing applications.

The above object is achieved by a packet processing system including a forwarding apparatus that sends and receives a packet by using a network interface and a control apparatus that includes an application receiving the packet sent from the forwarding apparatus, the control apparatus including:

a symbol part corresponding to address information of the forwarding apparatus; and a transfer control part for sending a request message, to the forwarding apparatus, requesting the forwarding apparatus to set a packet transfer rule for transferring a receiving packet to the application when detecting that a communication port generated by the application corresponds to the symbol part;

the forwarding apparatus including:

a transfer control part for setting the packet transfer rule as requested by the request message;

wherein the packet transfer rule includes an interface identifier corresponding to the communication port; and when the control apparatus detects that the interface identifier is changed, the control apparatus sends a correction message, to the forwarding apparatus, requesting the forwarding apparatus to correct the interface identifier in the packet transfer rule.

According to the present invention, when an application is launched in the control apparatus, a packet transfer rule for transferring the packet to the application can be set dynamically. In addition, even when the interface identifier is changed, the packet transfer rule can be corrected dynamically.

In the packet processing system, when the interface identifier in the packet transfer rule is an undecided value, the control apparatus sends the correction message to the forwarding apparatus after the interface identifier is decided.

In the packet processing system, the control apparatus sets the packet transfer rule in response to the request message, issues a signaling identifier to include the signaling identifier into the packet transfer rule and sends a response message that includes the signaling identifier to the control apparatus. By associating the signaling identifier with the packet transfer rule, correction or deletion of an entry of the packet transfer rule can be performed quickly.

The above object is also achieved by a packet processing system including a forwarding apparatus that sends and receives a packet by using a network interface and a control apparatus that includes an application receiving the packet sent from the forwarding apparatus, the control apparatus including:

a symbol part corresponding to address information of the forwarding apparatus; and a transfer control part for sending a request message, to the forwarding apparatus, requesting the forwarding apparatus to set a packet transfer rule for transferring a receiving packet to the application when detecting that a communication port generated by the application corresponds to the symbol part;

the forwarding apparatus including:

a transfer control part for setting the packet transfer rule as requested by the request message;

wherein, when a port number corresponding to the communication port is an undecided value, the control apparatus requests the forwarding apparatus to issue a port number, and the forwarding apparatus issues the port number for the control apparatus by referring to a port number table, and the control apparatus includes the issued port number into the request message and sends the request message to the forwarding apparatus.

According to the present invention, when an application is launched in the control apparatus, a packet transfer rule for transferring the packet to the application can be set dynamically. In addition, even when the port number is undecided, the forwarding apparatus can issue a specific port number. Thus, a packet transfer rule based on a specific port number can be set.

In the packet processing system, the control apparatus requests the forwarding apparatus to issue the port number by sending, to the forwarding apparatus, an issuing request message including a port undecided value indicating that the port number is undecided, and the forwarding apparatus changes the port undecided value in the issuing request message to a specific port number and sends the changed message as a response message to the control apparatus for issuing the port number for the forwarding apparatus.

BRIEF DESCRIPTION OF THE DRAWINGS

Other objects, features and advantages of the present invention will become more apparent from the following detailed description when read in conjunction with the accompanying drawings, in which:

FIG. 2 is an example of the tunnel generation request message in the packet processing system of FIG. 1;

FIG. 3 shows an example of the tunnel generation response message of the packet processing system of FIG. 1;

FIG. 4 shows an example of the transfer request message of the packet processing system shown in FIG. 1;

FIG. 5 shows an example of the receiving table 242 of the packet processing system shown in FIG. 1;

FIG. 6 shows an example of the sending table 244 of the packet processing system shown in FIG. 1;

FIG. 7 shows an example of the distribution table 342 of the packet processing system shown in FIG. 1;

FIG. 8 shows an example of the receiving table 344 of the packet processing system shown in FIG. 1;

FIG. 9 shows an example of the port number pool table 348;

FIG. 10 shows an example of a port number issuing request message;

FIG. 11 shows an example of a port number issuing response message;

FIG. 14 shows a transfer request message when virtual IF is undecided;

FIG. 15 shows an example of the transfer request response message;

FIG. 16 shows an example of the correction request message;

FIG. 17 shows an example of the correction request response message;

FIG. 21 shows an example of the receiving table 243;

FIG. 22 shows an example of the sending table 245;

FIG. 23 shows an example of the distribution table 343;

FIG. 24 shows an example of the receiving table 345;

FIG. 25 is a flowchart showing the procedure for registering a virtual IP address;

FIG. 26 shows an address conversion request message;

FIG. 28 shows an example of the transfer request message;

DETAILED DESCRIPTION OF THE PREFERRED EMBODIMENTS

In the following, preferred embodiments of the packet processing system of the present invention are described with reference to figures. In a first embodiment, a case where the packet processing system of the present invention is applied to a load balancer that performs load distribution of servers by using virtual interfaces is described. In a second embodiment, a case where the packet processing system of the present invention is applied to a load balancer that performs load distribution of servers by using virtual IP addresses is described. In third and fourth embodiments, a case where the packet processing system of the present invention is applied to a router in which a control apparatus and a forwarding apparatus are separated by using virtual interfaces is described. In a fifth embodiment, a computer system that executes a packet processing program is described. Finally, various modifications are described as other embodiments.

First Embodiment

In the first embodiment, a case where the packet processing system of the present invention is applied to a load balancer that performs load distribution of servers by using a virtual interface ("IF") is described. In this embodiment, after an outline and a distinctive feature are described, the configuration of the packet processing system is described, and finally, processing procedures are described such as a registration procedure of the virtual IF, a registration procedure of a distribution table, a data receiving procedure and a data sending procedure.

Outline and Distinctive Feature

Figure 1:
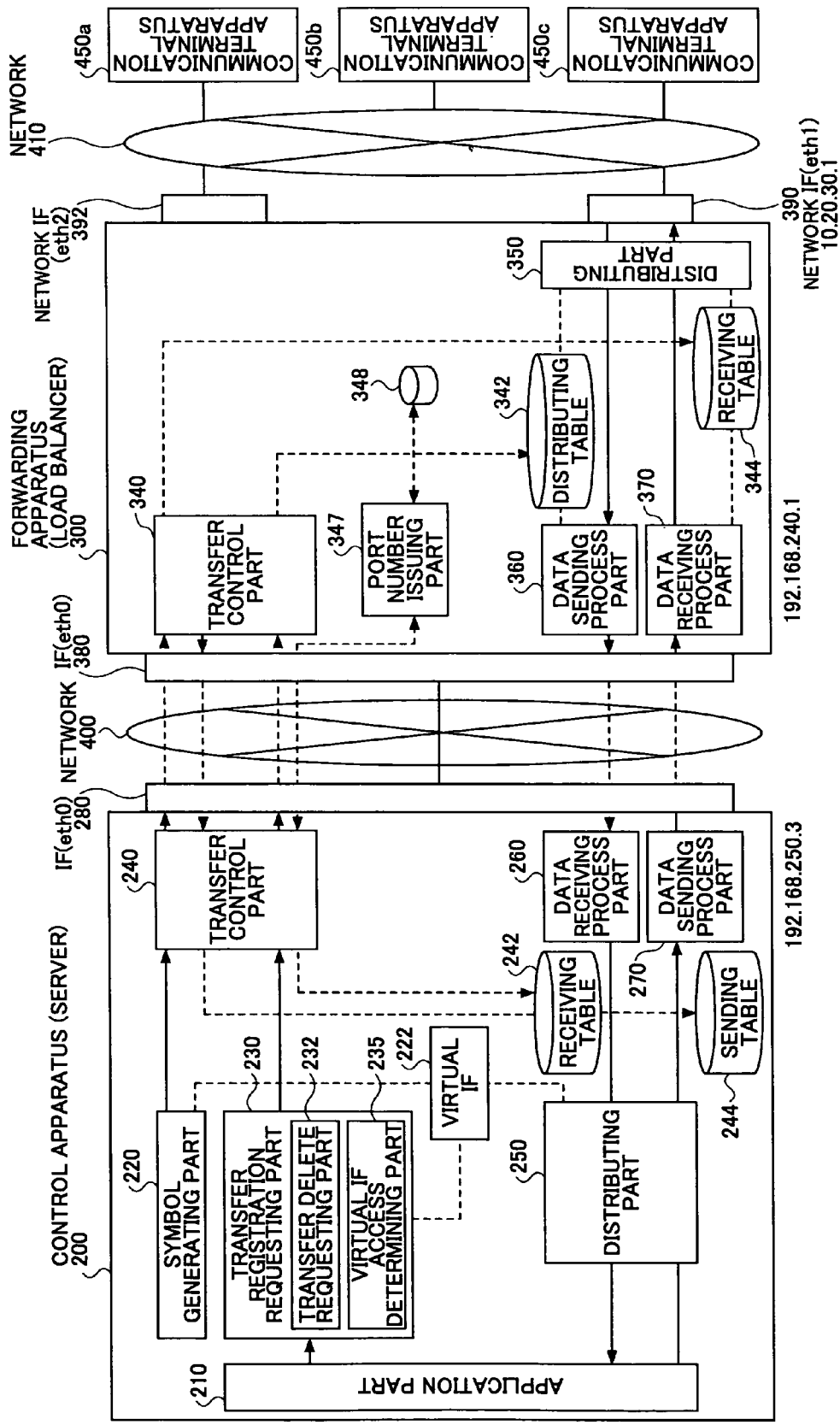
FIG. 1 shows a functional block diagram showing a configuration of a packet processing system of a first embodiment.

First, the outline and the distinctive main feature of the packet processing system of the present invention are described. FIG. 1 shows a functional block diagram showing the configuration of the packet processing system of the first embodiment.

The packet processing system shown in the figure includes a forwarding apparatus and a control apparatus that are connected. The forwarding apparatus sends and receives packets by using network interfaces, and the control apparatus executes an application that responds to the packet transmitted to the control apparatus on the basis of a packet transfer rule set in the forwarding apparatus. The packet transfer rule between the control apparatus and the forwarding apparatus can be dynamically set when a new application is launched in the control apparatus.

More specifically, in the packet processing system, a server 200 requests a load balancer 300 to set a packet transfer rule used for transferring a packet received by a network IF 390 to the server 200 when a communication port is opened (socket is opened) in response to a request by an application part 210. Then, the server sets a packet transfer rule for transferring a packet from the load balancer 300 to the server 200 associating the packet with the virtual IF 222. The load balancer 300 sets a packet transfer rule requested by the server 200. Thus, the server 200 can dynamically set a packet transfer rule between the server 200 and the load balancer 300 when the new application part 210 is launched on the server 200.

Further, in this embodiment, if a port number is undecided when the communication port is opened, the load balancer 300 can issue a specific port number (ephemeral port) in response to a request by the server 200. In addition, the packet processing apparatus of this embodiment has a function to modify the packet transfer rule after an IF number is determined to be a specific value if the IF number is undecided when the communication port is opened.

Configuration of the Packet Processing System

In the following, the configuration of the packet processing system of the first embodiment is described. As shown in FIG. 1, the packet processing system includes a control apparatus 200, a forwarding apparatus 300, communication terminal apparatuses 450a-450c, a network 400 that connects the control apparatus 200 and the forwarding apparatus 300, and a network 410 that connects the forwarding apparatus 300 and the communication terminal apparatuses 450a-450c.

Each of the networks 400 and 410 is a network in which communications are performed by the TCP/IP protocol on LANs, private lines or the Internet. The communication terminal apparatuses 450a-450c request an internet service from the forwarding apparatus 300 via the network 410.

The control apparatus 200 is a server that receives a service request from the communication terminal apparatus via the network IF 390 of the forwarding apparatus 300 and provides the internet service to the communication terminal apparatus. More specifically, the control apparatus 200 provides services of Web (HTTP, HTTPS), FTP, Email (SMTP, POP, IMAP), DNS, DB (Oracle, DB2) and the like.

The control apparatus 200 includes an application part 210, a symbol generating part 220, a virtual interface 222, a transfer registration requesting part 230, a transfer control part 240, a receiving table 242, a sending table 244, a distributing part 250, a data receiving process part 260, a data sending process part 270 and an IF 280.

The application part 210 is a program for providing an internet service, and the application part 210 communicates with the communication terminal apparatuses 450a-450c based on internet protocols (mainly TCP/UDP). The symbol generating part 220 sets and registers a virtual IF 222 in a kernel of an operating system of the control apparatus 200 associating the virtual IF 222 with the network IF 390 of the forwarding apparatus 300.

The virtual IF 222 is a network IF that corresponds to the network IF 390 of the forwarding apparatus 300 and that is virtually provided in the kernel of the operating system of the control apparatus 200 by the symbol generating part 220. More specifically, the virtual IF 222 is a functional part used for the application part 210 to send and receive packets for the communication terminal apparatuses 450a-450c. For example, the virtual IF 222 has a data structure for managing attribute information, packet operation procedure and statistical information.

The transfer registration request part 230 detects that the application part 210 opens a communication port and accesses the virtual IF 222, and requests the forwarding apparatus to register an upward tunnel for transferring a packet from the forwarding apparatus 300 to the control apparatus 200. The transfer registration request part 230 includes a transfer delete request part 232 and a virtual IF access determining part 234.

The transfer delete request part 232 detects that the application part 210 closes the communication port so as to request the forwarding apparatus 300 to delete the upward tunnel corresponding to the virtual IF 222. The virtual IF access determining part 234 detects that the application part 210 opens the communication port and accesses the virtual IF 222, and requests the forwarding apparatus 300 to transfer a packet.

When the application part 210 opens the communication port, even if a specific IF is not specified (specifying wild card) so that the IF is undecided, the transfer registration request part 230 requests the forwarding apparatus 300 to register an upward tunnel for transferring a packet from the forwarding apparatus 300 to the control apparatus 200.

The transfer control part 240 receives notification indicating that the virtual IF 222 is set from the symbol generating part 220, and, then, sends a downward tunnel generation request to the forwarding apparatus 300. In addition, when the transfer control part 240 receives a tunnel generation response message from the forwarding apparatus 300, the transfer control part 240 registers data in the sending table 244 in which the virtual IF 222, the downward tunnel and the forwarding apparatus 300 are associated with each other. In addition, when the transfer control part 240 receives notification, from the transfer registration request part 230, that the application part 210 generates the communication port for the virtual IF 222, the transfer control part 240 registers data in the receiving table 242 in which the virtual IF 222 is associated with the upward tunnel, and sends a transfer request message to the forwarding apparatus 300. If IF is undecided, the receiving table 242 is corrected when the IF is decided.

In the following, the tunnel generation request message sent by the transfer registration request part 230 to the forwarding apparatus 300, the tunnel generation response message sent from the forwarding apparatus 300, and the transfer request message sent by the transfer registration request part 30 to the forwarding apparatus 300 are described.

FIG. 2 is an example of the tunnel generation request message in the packet processing system of FIG. 1. FIG. 3 shows an example of the tunnel generation response message of the packet processing system of FIG. 1. FIG. 4 shows an example of the transfer request message of the packet processing system shown in FIG. 1.

As shown in FIG. 2, the tunnel generation request message includes a control apparatus address, the virtual IF and the actual IF that are associated with each other.

In addition, as shown in FIG. 3, the tunnel generation response message is a message for notifying of the downward tunnel ID that are associated with the forwarding apparatus address, the virtual IF 222 and the network IF 390.

As shown in FIG. 4, the transfer request message is a message for notifying of the upward tunnel ID that are associated with a control apparatus address, a port number and the virtual IF 222. The transfer request message further includes a message type and a signaling identifier. The message type indicates a type of the transfer request message. For example, if the type is "0", the message indicates a normal transfer request. Each type will be described later. The signaling identifier is for uniquely identifying a signaling for generating a packet transfer rule corresponding to a communication port of the application part 210.

The receiving table 242 is an upward tunnel management table in the control apparatus 200 in which the virtual IF 222 is associated with the upward tunnel ID. The sending table 244 is a downward tunnel management table in the control apparatus in which the downward tunnel ID is associated with the forwarding apparatus address and the virtual IF 222. In the following, examples of the receiving table 242 and the sending table 244 are described.

FIG. 5 shows an example of the receiving table 242 of the packet processing system shown in FIG. 1. FIG. 6 shows an example of the sending table 244 of the packet processing system shown in FIG. 1.

The receiving table 242 is a table used for searching for a virtual IF 222 from an upward tunnel ID of a packet transmitted from the forwarding apparatus 300. The receiving table 242 includes a signaling identifier. The sending table 242 is a table used for searching for a downward tunnel ID and an address of the forwarding apparatus 300 from the virtual IF 222 by which the application part 210 sends the packet.

The distributing part 250 is a processing part for associating a packet sent from the application part 210 with the virtual IF 222 and transferring the packet downward. More specifically, the virtual IF 222 is determined from a destination address of the packet, and the packet is transmitted downward to the data sending processing part 270 corresponding to the virtual IF 222. In addition, the distributing part 250 receives a packet transmitted upward by the data receiving processing part 260, and transfers the packet upward to the application part 210 on the basis of the header of the packet.

The data receiving processing part 260 receives a packet transferred upward from the forwarding apparatus 300, searches the receiving table 242, and transfers the packet by associating the packet with the virtual IF 222. More particularly, when the data receiving processing part 260 receives a packet encapsulated with the upward tunnel ID, the data receiving processing part 260 searches the receiving table 242 for a virtual IF 222 corresponding to the upward tunnel ID by using the upward tunnel ID as a key, and decapsulates the packet, and transfers the packet upward to the distributing part 250 by associating the packet with the virtual IF 222.

The data sending processing part 270 receives a packet that is downward transferred from the distributing part 250, searches the sending table 244 associating the packet with the downward tunnel, and transmits the packet downward to the forwarding apparatus 300. More specifically, when the data sending processing part 270 receives a packet from the distributing part 250, the data sending processing part 270 searches the sending table 244 for a downward tunnel ID by using a virtual IF 222 corresponding to the packet as a key, encapsulates the packet and transfers the packet downward to the forwarding apparatus 300. In addition, the IF 280 is an interface used for communicating with the forwarding apparatus 300 via the network 400.

The forwarding apparatus 300 is a load balancer that receives a service request from the communication terminal apparatuses 450a-450c connected via the network 410, and relays the service request to the control apparatus. In addition, the forwarding apparatus 300 relays a packet transferred from the control apparatus 200 to the communication terminal apparatuses 450a-450c in response to a request from the communication terminal apparatus.

The forwarding apparatus 300 includes a transfer control part 340, a distribution table 342, a receiving table 344, a distributing part 350, a data receiving process part 360, a data receiving process part 370, an IF 380, network IFs 390 and 392, a port number issuing part 347 and a port pool table 348. When the transfer control part 340 receives a tunnel generation request message from the control apparatus 200, the transfer control part 340 sends a tunnel generation response message to notify the control apparatus 200 of an unused downward tunnel ID, and registers the downward tunnel in the receiving table 344. In addition, when the transfer control part 340 receives a transfer request message from the control apparatus 200, the transfer control part 340 registers an upward tunnel ID, a port number of the application part 210 and a destination control apparatus address in the distribution table 342. In addition, the transfer control part 340 sends a transfer request response message in response to the transfer request message, and sends a correction request response message in response to a correction request message.

The distribution table 342 is an upward tunnel management table including a network IF 390, a port number of the application part 210, the upward tunnel ID, the destination control apparatus address, and a signaling identifier that are associated with each other. The receiving table 344 is a downward tunnel management table in the forwarding apparatus in which the downward tunnel ID is associated with the network IF 390.

In the following, examples of the distribution table 342 and the receiving table 344 of the packet processing system are described. FIG. 7 shows an example of the distribution table 342 of the packet processing system shown in FIG. 1, and FIG. 8 shows an example of the receiving table 344 of the packet processing system shown in FIG. 1.

The distribution table 342 is a table used for searching for an application part 210 to which a packet is to be sent by using a destination address of the packet received from a network IF. The receiving table 344 is a table used for searching for a network IF 390 by using a downward tunnel ID of a packet transferred from the control apparatus 200.

The distributing part 350 is a processing part that searches the distribution table 342 to find a destination of a packet received from a network IF 390. If the destination is the application part 210 of the control apparatus, the distributing part 350 transfers the packet upward. In addition, the distributing part 350 transfers a packet received from the data receiving processing part 370 to a corresponding network IF 390.

The data sending process part 360 is a processing part that receives a packet transmitted upward by the distributing part 350, searches the distribution table 342 for associating the packet with the control apparatus 200, and upward transfers the packet to the control apparatus 200. More particularly, when the data sending process part 360 receives a packet from the distributing part 350, the data sending process part 360 retrieves an upward tunnel ID and a destination control apparatus address from the distribution table 342 by using a port number and an IF of the packet. Then, the data sending process part 360 encapsulates the packet and transfers the packet upward to the control apparatus 200.

The data receiving process part 370 is a processing part that receives a packet transferred downward by the control apparatus 200, searches the receiving table 344 for associating the packet with a network IF 390, and transfers the packet downward to the network IF 390. More particularly, when the data receiving process part 370 receives a packet encapsulated with the downward tunnel ID, the data receiving process part 370 retrieves a network IF 390 corresponding to the downward tunnel ID from the receiving table 344. Then, the data receiving process part 370 decapsulates the packet, associates the packet with the network IF 390 and transfers the packet downward to the distributing part 350.

The port number issuing part 347 is processing part that issues an unused port number by referring to the port number pool table 348 and sends a port number issuing response message to the control apparatus when the port number issuing part 347 receives a port number issuing request message from the transfer control part 240 in the control apparatus 200.

The port number pool table 348 is a table for storing port numbers that are being used by applications in the control apparatus in a number space that can be used as undecided port numbers (ephemeral ports).

FIG. 9 shows an example of the port number pool table 348. As shown in FIG. 9, the port number pool table 348 stores use status, port number using control apparatus address and port number using process number for each port number. FIG. 10 shows an example of a port number issuing request message. As shown in FIG. 10, the message includes a message type that indicates that the message is a request, a control apparatus address, a process ID and an undecided port number. A port number issuing response message shown in FIG. 11 includes a message type that indicates a response, a control apparatus address, a process ID and a issued port number.

The network IFs 390 and 392 are interfaces connecting the forwarding apparatus 300 and the communication terminal apparatus 450a-450c via the network 410. The IF 380 is an interface for connecting the forwarding apparatus 300 and the control apparatus 200 via a network 400.

Procedure for Registering Virtual IF in the Packet Processing System

Figure 12:
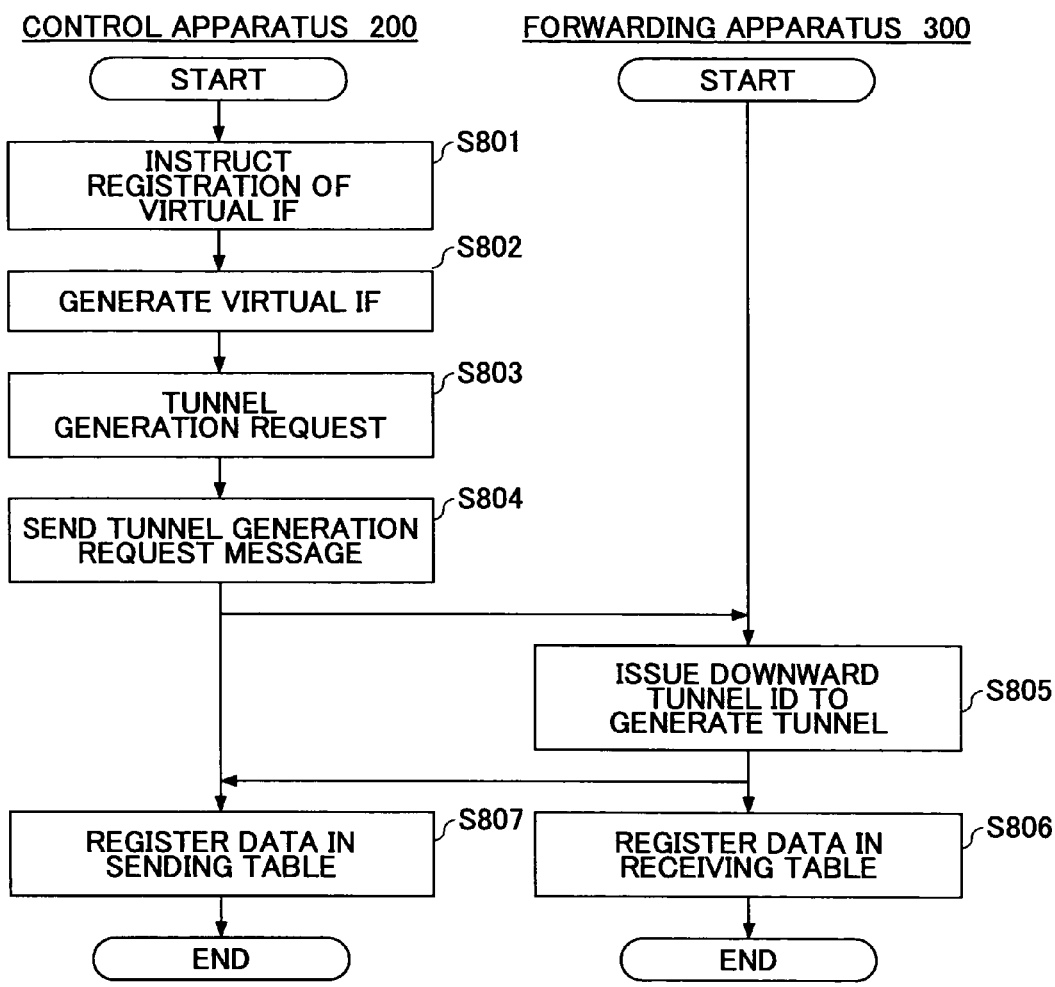
FIG. 12 is a flowchart showing the procedure for registering the virtual interface ("IF") in the packet processing system shown in FIG. 1.

Next, the procedure for registering a virtual IF in the packet processing system shown in FIG. 1 is described. FIG. 12 is a flowchart showing the procedure for registering the virtual IF.

First, a manager instructs registration of the virtual IF 222 by using the symbol generating part 220 in step S801. Then, the symbol generating part 220 generates the virtual IF 222 corresponding to the network IF 390 in control apparatus 200 in step S802. In addition, the symbol generating part 220 requests the transfer control part 240 to generate a downward tunnel for transferring a packet from the virtual IF 222 in the control apparatus 200 to the network IF 390 in the forwarding apparatus 300 in step S803. Then, the transfer control part 240 of the control apparatus 200 sends a tunnel generation request message shown in FIG. 2 to the forwarding apparatus 300 in step S804.

In addition, the transfer control part 340 of the forwarding apparatus 300 issues an unused downward tunnel ID, and sends a tunnel generation response message shown in FIG. 3 to the control apparatus 200 in step S805, and registers the downward tunnel ID and the network IF 390 in the receiving table 344 of the forwarding apparatus 300 in which the downward tunnel ID is associated with the network IF 390 in step S806. Then, when the transfer control part 240 of the control apparatus 200 receives the tunnel generation response message from the forwarding apparatus 300, the transfer control part 240 registers the upward tunnel ID and the virtual IF 222 in the sending table 244 in which the upward tunnel ID is associated with the virtual IF 222 in step S807.

Procedure for Registering Distribution Table in the Packet Processing System

Figure 13:
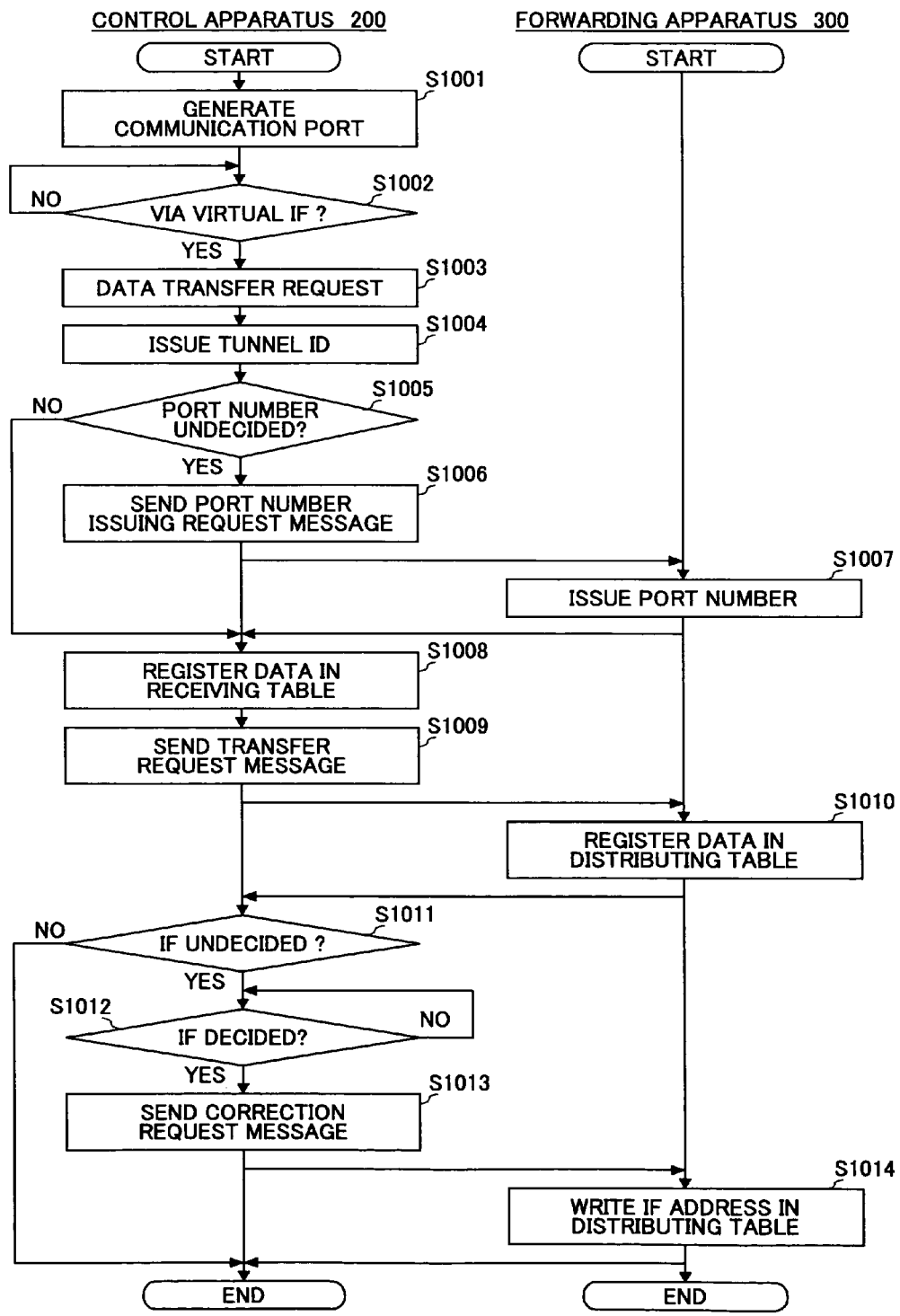
FIG. 13 is a flowchart showing the procedure for registering the distribution table in the packet processing system shown in FIG. 1.

Next, the procedure for registering distribution table in the packet processing system shown in FIG. 1 is described. FIG. 13 is a flowchart of the procedure.

First, the application part 210 requests the kernel of the OS to open a communication port for performing communication in step S1001. Then, the transfer registration request part 230 waits until the application part 210 opens the port via the virtual IF 222 in step S1002. When the port via the virtual IF 222 is opened, the transfer registration request part 230 sends a data transfer request to the transfer control part 240 in step S1003. More particularly, in the data transfer request, the transfer registration request part 230 requests the transfer control part 240 to set the distribution table 342 and generate an upward tunnel such that the forwarding apparatus 300 can transmits a packet upward to the control apparatus 200. Then, the transfer control part 240 of the control apparatus 200 issues an unused upward tunnel ID in step S1004.

When the application opens the communication port, an IF address and a port number are specified. However, there may be a case where a specific IF is not specified (to be referred to as "wildcard"). In addition, there may be a case where a specific port number is not specified (to be referred to as "ephemeral port").

If the port number is undecided at the time when the communication port is generated (Yes in S1005), the transfer control part 240 sends a port number issuing request message shown in FIG. 10 to the forwarding apparatus 300 in step S1006.

When the forwarding apparatus 300 receives the port number issuing request message, the forwarding apparatus 300 issues an unused port number (32769, for example) from the port number pool table 348 shown in FIG. 9, and includes the port number into a port number issuing response message shown in FIG. 11. Then, the forwarding apparatus 300 sends the port number issuing response message to the control apparatus 200 in step S1007. When the control apparatus 200 receives the port number issuing response message, the control apparatus 200 sets the issued port number in the communication port (socket) of the application part 210.

Next, the control apparatus 200 registers the upward tunnel ID and the virtual IF 222 into the receiving table 242 in which the upward tunnel ID is associated with the virtual IF 222 in step S1008. In the receiving table 242, the port number (32769) included in the port number issuing response message is recorded as a signaling identifier. If the IF is designated as a wildcard, a value (0, for example) indicating that IF is undecided is registered instead of a specific virtual IF.

Next, the control apparatus 200 sends the transfer request message shown in FIG. 4 to the transfer control part 340 of the forwarding apparatus 300 in step S1009. If the port number is undecided, the control apparatus 200 sends a transfer request message to the forwarding apparatus 300 in which the port number included in the port number issuing response message is set in a port number field. In this case, since the signaling identifier is undecided, the signaling identifier is 0. If the virtual IF is undecided at this time, a transfer request message in which the virtual IF is 0 as shown in FIG. 14 is sent to the forwarding apparatus 300.

The transfer control part 340 of the forwarding apparatus 300 receives the transfer request message from the control apparatus 200, and the transfer control part 340 registers the port number included in the transfer request message, the upward tunnel ID, the control apparatus address, and IF corresponding to the virtual IF into the distribution table 342 in step S1010. If the virtual IF is undecided, a value (0, for example) indicating that IF is undecided is recorded in the distribution table 342 as IF. Further, the forwarding apparatus 300 issues a signaling identifier and records the signaling identifier in the distribution table in which the signaling identifier is associated with the above-mentioned information. Then, the forwarding apparatus 300 sends a transfer request response message including the signaling identifier to the control apparatus 200 in step S1010. An example of the transfer request response message is shown in FIG. 15. The control apparatus 200 records the signaling identifier included in the received transfer request response message in the receiving table 242.

If the IF is undecided at the time when the communication port of the application part 210 is opened (Yes in step S1011), following processes are performed.

When a connection to an application is established, and the OS kernel receives a packet from the application of the connection destination, the kernel of the control apparatus 200 writes an end point address included in the packet into the communication port (socket) as an IF number. Accordingly, n virtual IF corresponding to the communication port is specified (Yes in step S1012).

After that, the specified virtual IF is recorded in the receiving table 242. Then, the control apparatus 200 obtains the signaling identifier, and sends a correction request message including the signaling identifier and the specified virtual IF to the forwarding apparatus 300 in step S1013. FIG. 16 shows an example of the correction request message. As mentioned above, by using the signaling identifier, a target entry for correction in the distribution table 342 can be specified so that processes can be performed speedily.

When the transfer control part 340 in the forwarding apparatus 300 receives the correction request message, the transfer control part 340 finds an entry corresponding to the signaling identifier in the correction request message from the distribution table 342, and changes the undecided receiving IF field into a specific IF number, and changes the message type of the correction request message into a correction request response (=3). Then, the transfer control part 340 sends a correction request response message to the control apparatus 200 in step S1014. FIG. 17 shows an example of the correction request response message.

As mentioned above, when the control apparatus 200 detects that the application part 210 accesses the virtual IF 222, the control apparatus 200 requests the forwarding apparatus 300 to set a packet transfer rule for transferring a packet received via the network IF 390 to the control apparatus 200, and the control apparatus sets a packet transfer rule for transferring a packet from the forwarding apparatus to the control apparatus 200 by associating the packet with the virtual IF 222. The forwarding apparatus 300 sets the packet transfer rule requested by the control apparatus 200. Thus, when a new application is launched on the control apparatus 200, the control apparatus 200 can dynamically set a packet transfer rule between the control apparatus 200 and the forwarding apparatus 300. Thus, an operation in which a process in the control apparatus operates as if the process operates in the forwarding apparatus can be realized without modifying the existing applications while the forwarding apparatus 300 and the control apparatus 200 are separated. In addition, even when the application part 210 opens the communication port in which IF or port number is undecided, the packet transfer rule can be corrected or set when the value is decided.

In addition, when the control apparatus 200 detects that the application part 210 closes the communication port to access the virtual IF 222, the control apparatus 200 requests the forwarding apparatus 300 to delete the packet transfer rule for transferring a packet received via the network IF 390 to the control apparatus 200, and deletes a packet transfer rule for transferring a packet from the forwarding apparatus 300 to the control apparatus 200 by associating the packet with the virtual IF 222. The forwarding apparatus 300 deletes the packet transfer rule as requested by the control apparatus 200. Thus, if the application stops in the control apparatus 200, the control apparatus 200 can dynamically deletes the packet transfer rule between the control apparatus 200 and the forwarding apparatus 300.

Procedure for Receiving Data in the Packet Processing System

Figure 18:
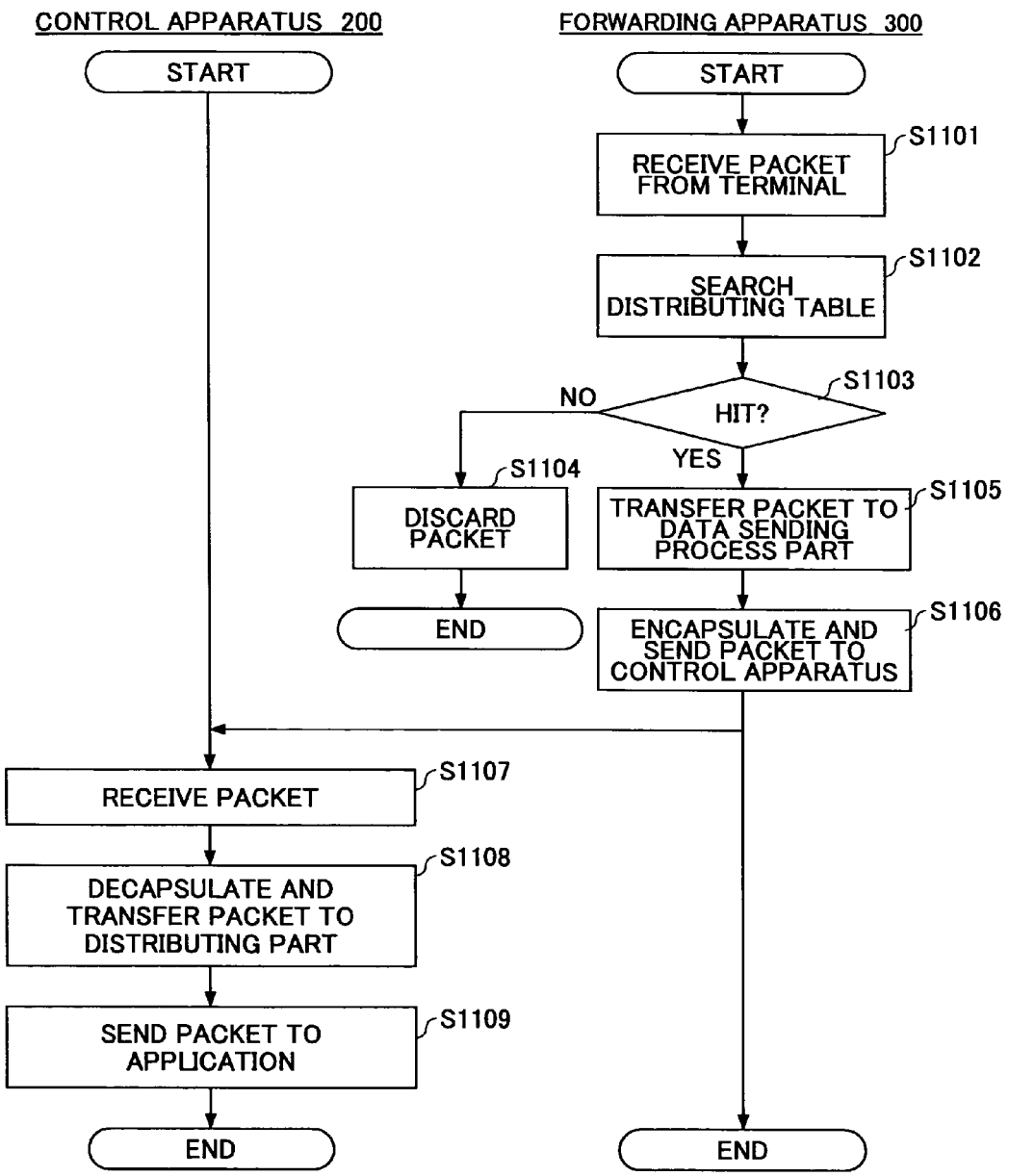
FIG. 18 shows a flowchart of the procedure for receiving data in the packet processing system shown in FIG. 1.

Next, the procedure for receiving data in the packet processing system shown in FIG. 1 is described. FIG. 18 shows a flowchart of the procedure.

First, the forwarding apparatus 300 receives a packet from a communication terminal apparatus in step S1101. Then, the distributing part 350 of the forwarding apparatus 300 searches the distribution table 342 on the basis of the port number of the packet and the receiving IF address in step S1102 to check whether the port number and the receiving IF address correspond to the application part 210 in step S1103. As a result, if the port number and the receiving IF address do not correspond to the application part 210 in the control apparatus 200 (No in step S1103), the packet is discarded in step S1104.

On the other hand, if the port number and the receiving IF address correspond to the application part 210 in the control apparatus 200 (Yes in step S1103), the forwarding apparatus 300 transfers the packet to the data sending process part 360 in step S1105. Further, the data sending process part 360 retrieves the tunnel ID corresponding to the port number and the receiving IF address from the distribution table 342. Then, the data sending processing part 360 encapsulates the packet with the upward tunnel ID and transfers the packet to the control apparatus 200 in step S1106.

The data receiving process part 260 of the control apparatus receives the encapsulated packet in step S1107, and searches the receiving table 242 by using the upward tunnel ID. Then, the data receiving process part 260 decapsulates the packet and transfers the packet to the distributing part 250 by associating the packet with the virtual IF 222 in step S1108. In addition, the distributing part 250 specifies the communication port of the application part 210 from a communication port of the packet so as to send the packet to the application part in step S1109.

Procedure for Sending Data in Packet Processing System

Figure 19:
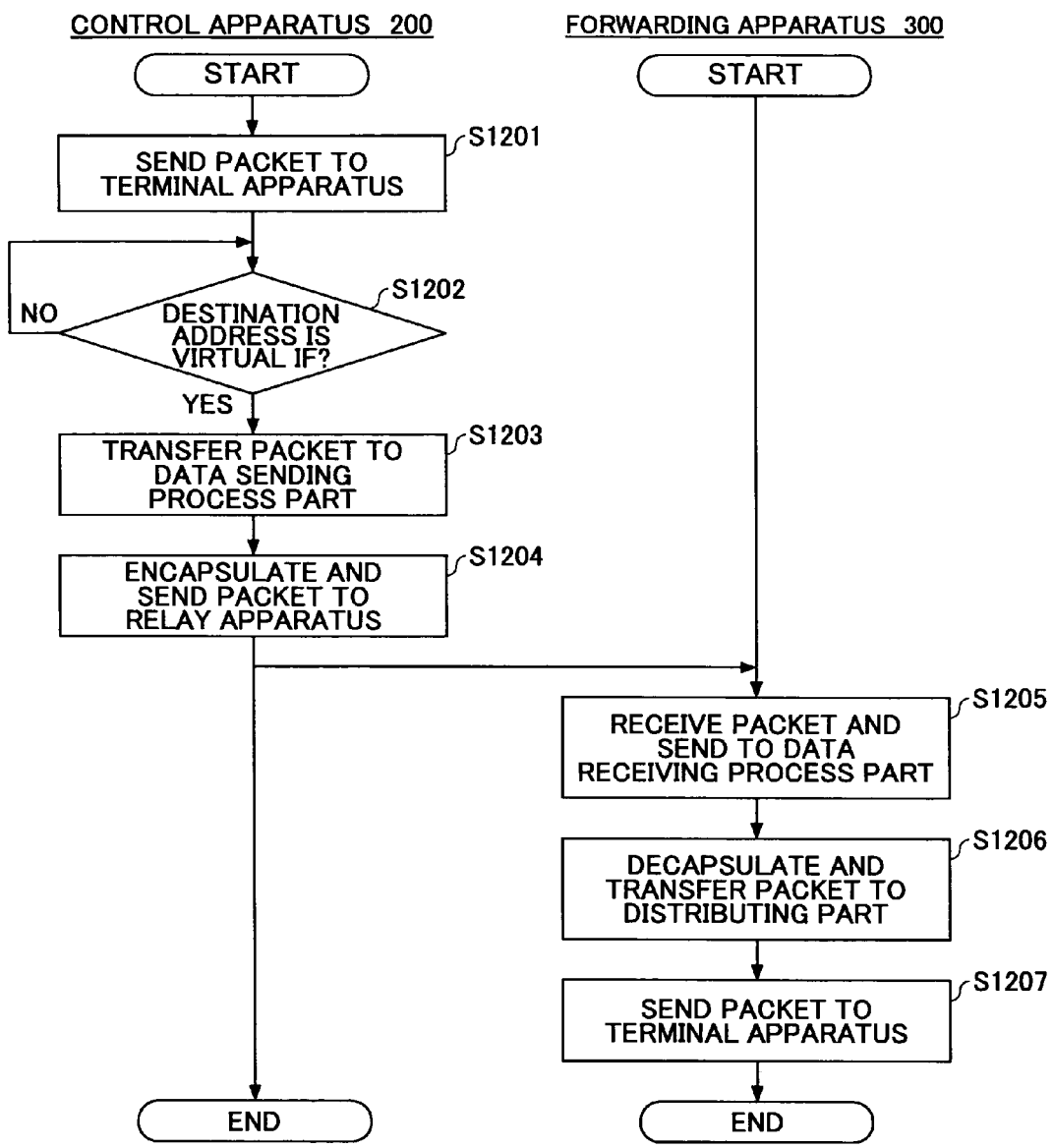
FIG. 19 shows a flowchart of the procedure for sending data in the packet processing system shown in FIG. 1.

Next, the procedure for sending data in the packet processing system shown in FIG. 1 is described. FIG. 19 is a flowchart showing the procedure.

First, the application part 210 sends a packet to a communication terminal apparatus (450*a*-450*c*) in step S1201. Then, the distributing part 250 waits for a packet whose destination address is the virtual IF 222 in step S1202, and sends the packet to the data sending process part 270 when the packet arrives in step S1203. Further, the data sending process part 270 retrieves a downward tunnel ID from the sending table 244 on the basis of the virtual IF 222, and encapsulates the packet with the downward tunnel ID and transfers the packet to the forwarding apparatus 300 in step S1204.

After that, the data receiving process part 370 of the forwarding apparatus 300 receives the encapsulated packet from the control apparatus 200 in step S1205. Then, the data receiving process part 370 searches the receiving table 344 by using the downward tunnel ID, decapsulates the packet and sends the packet to the distributing part 350 by associating the packet with the network IF 390 in step S1206. Further, the distributing part 350 sends the packet to the communication terminal apparatus from the network IF 390 in step S1207.

Second Embodiment

In the first embodiment, a case where the present invention is applied to a load balancer that performs load distribution by using virtual IF is described. However, the present invention is not limited to this. The present invention can be also applied to a load balancer that performs load distribution of servers by using virtual IP address. In the second embodiment, a load balancer that performs load distribution of servers by using virtual IP address is described. In this embodiment, after the configuration of the packet processing system of the second embodiment is described, processing procedures are described such as a registration procedure of the virtual IP address, a registration procedure of a distribution table, a data receiving procedure and a data sending procedure. In the following description, features different from the first embodiment are mainly described.

Configuration of the Packet Processing System

Figure 20:
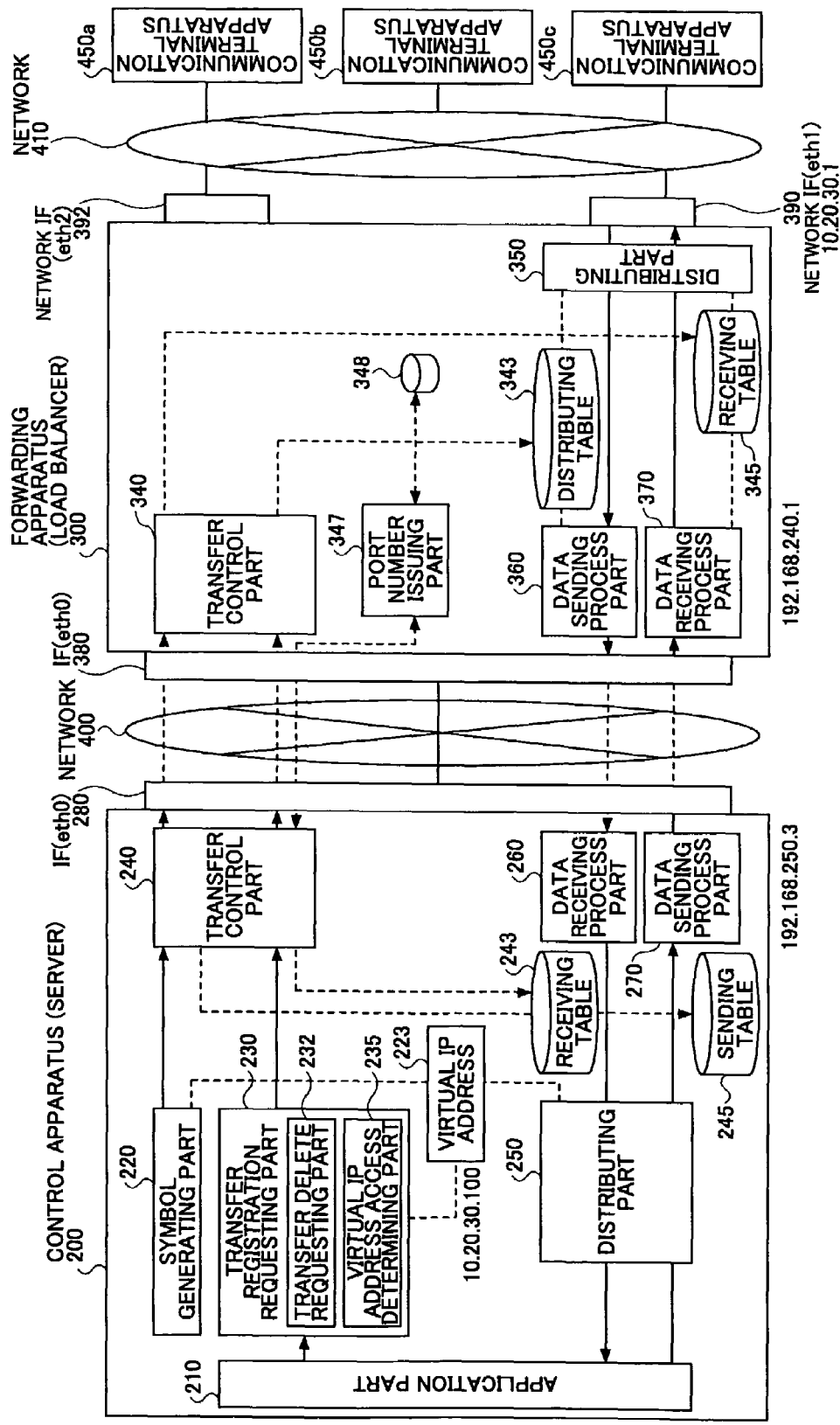
FIG. 20 is a functional block diagram showing the configuration of the packet processing system of the second embodiment.

In the following, the configuration of the packet processing system of the second embodiment is described. FIG. 20 is a functional block diagram showing the configuration of the packet processing system of the second embodiment. Processing parts different from the first embodiment are a virtual IP address 223, a virtual IP address access determining part 235, a receiving table 243 and a sending table 245 in the control apparatus, and a distribution table 343 and a receiving table 345 in the forwarding apparatus.

The virtual IP address 223 is an IP address virtually set by the symbol generating part 220 in the kernel of the operating system of the control apparatus 200 wherein the virtual IP address 223 corresponds to an IP address of an IF of the forwarding apparatus 300. More particularly, the communication terminal apparatus (450*a*-450*c*) sends a packet to the l IP address of the forwarding apparatus 300.

The virtual IP address access determining part 235 detects that the application part 210 opens a communication port to access the virtual IP address 223, and requests the forwarding apparatus 300 to transfer a packet. Even if the application part 210 does not specify a specific IF (IP address) when the application part 210 opens a communication port so that IF is undecided (wildcard specification), the virtual IP address access determining part 235 requests the forwarding apparatus 300 to transfer a packet.

The receiving table 243 is a management table for upward address conversion in the control apparatus in which destination IP address, destination port number, virtual IP address and signaling identifier are associated with each other. The sending table is a management table for downward address conversion in the control apparatus 200 in which the virtual IP address is associated with sending source IP address. In the following, examples of the receiving table 243 and the sending table 245 are described. FIG. 21 shows an example of the receiving table 243, and FIG. 22 shows an example of the sending table 245.

The receiving table 243 is a table used for converting a destination IP address of a packet transferred from the forwarding apparatus 300 into a virtual IP address. The sending table 245 is a table used for converting a virtual IP address from which the application part 210 sends a packet into a sending source IP address.

The distribution table 343 is a management table for upward address conversion in the forwarding apparatus 300 in which a port number of a communication port (socket) opened by the application part 210, destination IP address and receiving IF address are associated with each other. The receiving table 345 is a management table for downward address conversion in the forwarding apparatus 300 in which the virtual IP address is associated with the sending source IP address. FIG. 23 shows an example of the distribution table 343, and FIG. 24 shows an example of the receiving table 345. The distributing table 343 is a table for retrieving a destination application part from a port number and an IF of a packet received by a network IF (receiving IF). The receiving table 345 is a table used for converting a sending source IP address of a packet transferred from the control apparatus 200 into a virtual IP address.

Procedure for Registering Virtual IP Address in the Packet Processing System

Next, the procedure for registering a virtual IP address in the packet processing system shown in FIG. 20 is described. FIG. 25 is a flowchart showing the procedure for registering a virtual IP address.

First, a manager instructs registration of the virtual IP address 223 by using the symbol generating part 220 in step S1801. Then, the symbol generating part 220 generates the virtual IP address 223 corresponding to the IF address of the forwarding apparatus 300 in step S1802. In addition, the symbol generating part 220 requests the transfer control part 240 to register the virtual IP address and the sending source IP address in step S1803. Then, the transfer control part 240 of the control apparatus 200 sends an address conversion request message shown in FIG. 26 to the forwarding apparatus 300 in step S1804.

In addition, the transfer control part 340 of the forwarding apparatus 300 registers the virtual IP address 223 and the source IP address in the receiving table 344 of the forwarding apparatus 300 in which the virtual IP address 223 is associated with the sending source IP address in step S1805. FIG. 26 shows an example of the address conversion request message. The address conversion request message includes the virtual IP address 223 and the corresponding sending source IP address as shown in FIG. 26.

Procedure for Registering Distribution Table in the Packet Processing System

Figure 27:
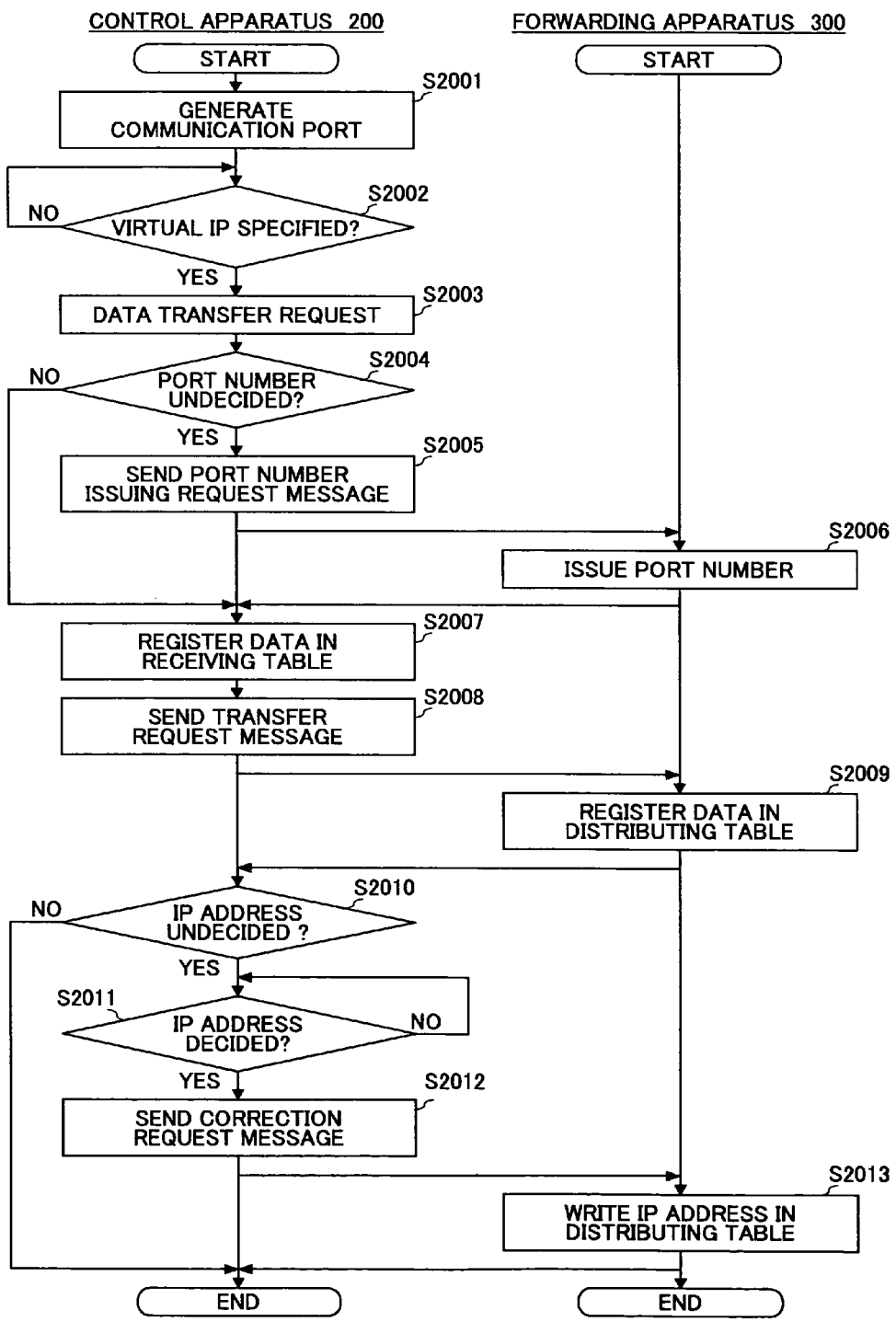
FIG. 27 is a flowchart of the procedure for registering distribution table in the packet processing system shown in FIG. 20.

Next, the procedure for registering distribution table in the packet processing system shown in FIG. 20 is described. FIG. 27 is a flowchart of the procedure.

First, the application part 210 requests the kernel of the OS to open a communication port for performing communication in step S2001. Then, the transfer path registration request part 230 waits until the application part 210 opens a port specifying the virtual IP address 223 in step S2002. When the port is opened, the transfer path registration request part 230 requests the transfer control part 240 to send a transfer request message S2003.

If the port number is undecided at the time when the communication port is generated (Yes in S2004), the transfer control part 240 sends a port number issuing request message shown in FIG. 10 to the forwarding apparatus 300 in step S2005.

When the forwarding apparatus 300 receives the port number issuing request message, the forwarding apparatus 300 issues an unused port number (32769, for example) from the port number pool table 348 shown in FIG. 9, and includes the port number into a port number issuing response message shown in FIG. 11. Then, the forwarding apparatus 300 sends the port number issuing response message to the control apparatus 200 in step S2006. When the control apparatus 200 receives the port number issuing response message, the control apparatus 200 sets the issued port number in the communication port (socket) of the application part 210.

Next, the transfer control part 240 of the control apparatus 200 registers the destination IP address and the virtual IP address 223 and a signaling identifier (port number in the port number issuing response message if signaling identifier is undevided) into the receiving table 242 in which the destination IP address is associated with the virtual IP address 223 in step S2007. If there a plurality of virtual IP addresses and a specific virtual IP address is not decided, a value (0, for example) indicating the virtual IP address is undecided is recorded. In addition, the control apparatus sends a transfer request message almost the same as the first embodiment to the transfer control part 340 of the forwarding apparatus in step 2008. Compared with the first embodiment, the virtual IF is replaced by the virtual IP address, the upward tunnel ID is replaced by the receiving IP address in the second embodiment. If the virtual IP address is undecided, the value is 0, for example, like the first embodiment. FIG. 28 shows an example of the transfer request message.

The transfer control part 340 of the forwarding apparatus 300 receives the transfer request message from the control apparatus 200, the transfer control part 340 registers the port number included in the transfer request message, the control apparatus address, a receiving IF corresponding to the virtual IP address and a signaling identifier into the distribution table 342, and sends a transfer request response message to the control apparatus 200 in step S2009. If the virtual IP address is undecided, a value (0, for example) indicating that the virtual IP address is undecided is recorded in the distribution table 342.

If the virtual IP address is undecided at the time when the communication port of the application part 210 is opened (Yes in step S2010), following processes are performed.

When a connection between an application of a connection destination and the control apparatus is established, and the control apparatus 200 receives a packet from the application of the connection destination, the OS kernel of the control apparatus 200 regards an end point address included in the packet as the virtual IP address, and writes IF that can receive the packet including the virtual IP address into the communication port (socket) as an IF number. Accordingly, a virtual IP address corresponding to the communication port is specified (Yes in step S2011).

After that, the specified virtual IP address is recorded in the receiving table 242. Then, the control apparatus 200 obtains the signaling identifier, and sends a correction request message including the signaling identifier and the specified virtual IP address to the forwarding apparatus 300 in step S2012. The correction request message of this embodiment is different from one shown in FIG. 16 in that the virtual IF becomes the virtual IP address and the upward tunnel ID becomes the receiving IP address. Other messages relating to correction have the same different points.

When the transfer control part 340 in the forwarding apparatus 300 receives the correction request message, the transfer control part 340 finds an entry corresponding to the signaling identifier in the correction request message from the distribution table 343, and changes the undecided virtual IP address field into a specific IP address, and changes the message type of the correction request message into a correction request response (=3). Then, the transfer control part 340 sends a correction request response message to the control apparatus 200 in step S2013.

As mentioned above, when the control apparatus 200 detects that the application part 210 accesses the virtual IP address 223, the control apparatus 200 requests the forwarding apparatus 300 to set a packet transfer rule for transferring a packet received via the network IF 390 to the control apparatus 200, and the control apparatus sets a packet transfer rule for transferring a packet from the forwarding apparatus to the control apparatus 200 by associating the packet with the virtual IP address 223. The forwarding apparatus 300 sets the packet transfer rule requested by the control apparatus 200. Thus, when a new application is launched on the control apparatus 200, the control apparatus 200 can dynamically set a packet transfer rule between the control apparatus 200 and the forwarding apparatus 300. In addition, even when the application part 210 opens the communication port in which virtual IP address or port number is undecided, the packet transfer rule can be corrected or set when the value is decided.

In addition, when the control apparatus 200 detects that the application part 210 closes the communication port to access the virtual IP address 223, the control apparatus 200 requests the forwarding apparatus 300 to delete the packet transfer rule for transferring a packet received via the network IF 390 to the control apparatus 200, and deletes a packet transfer rule for transferring a packet from the forwarding apparatus 300 to the control apparatus 200 by associating the packet with the virtual IP address 223. The forwarding apparatus 300 deletes the packet transfer rule as requested by the control apparatus 200. Thus, if the application stops in the control apparatus 200, the control apparatus 200 can dynamically deletes the packet transfer rule between the control apparatus 200 and the forwarding apparatus 300.

Procedure for Receiving Data in the Packet Processing System

Figure 29:
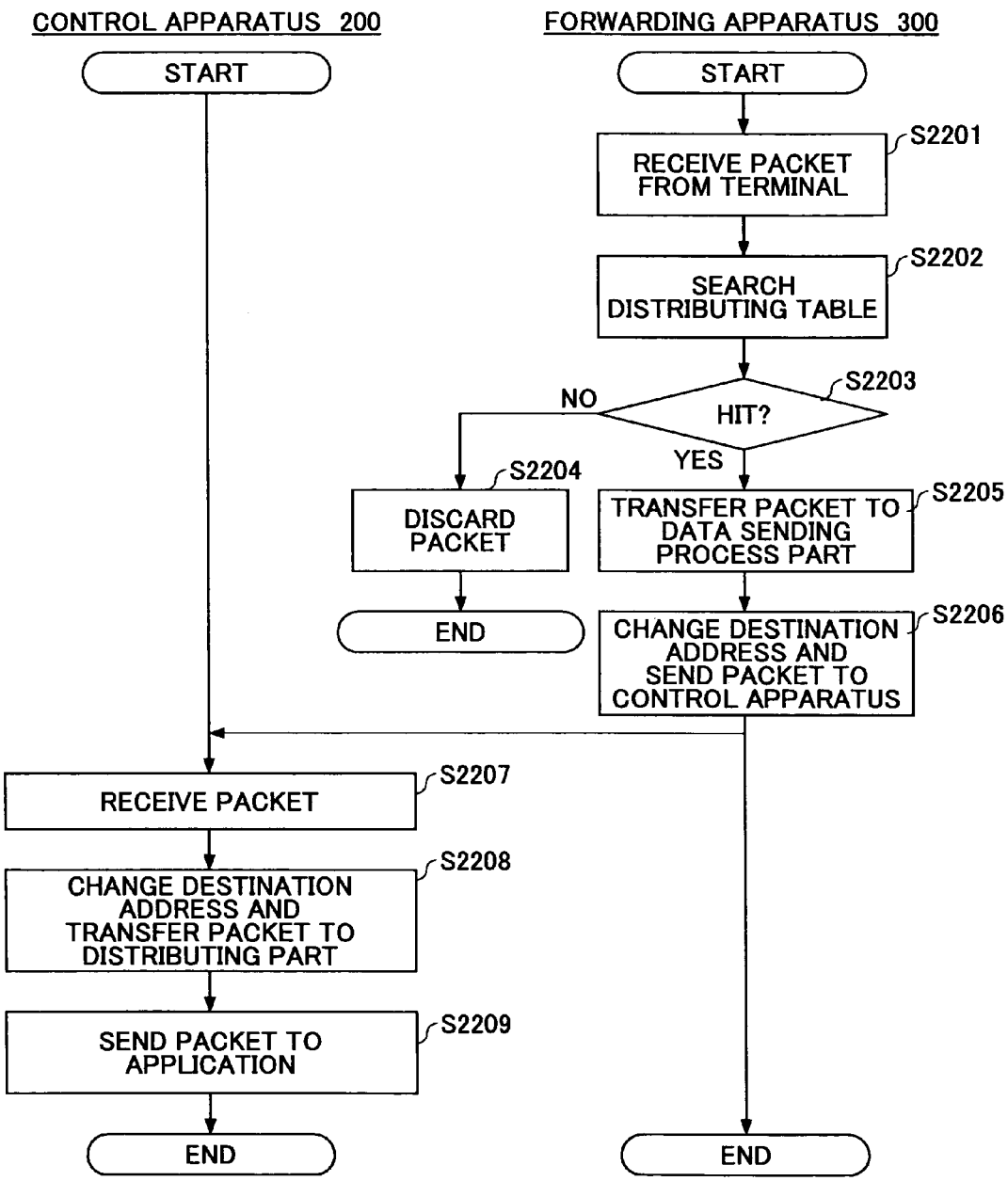
FIG. 29 shows a flowchart of the procedure for receiving data in the packet processing system shown in FIG. 20.

Next, the procedure for receiving data in the packet processing system shown in FIG. 20 is described. FIG. 29 shows a flowchart of the procedure.

First, the forwarding apparatus 300 receives a packet from a communication terminal apparatus in step S2201. Then, the distributing part 350 of the forwarding apparatus 300 searches the distribution table 343 on the basis of the port number of the packet and the end point IP address in step S2202 to check whether the port number and end point IP address correspond to the application part 210 in step S2203.

As a result, if the port number and the end point IP address do not correspond to the application part 210 in the control apparatus 200 (No in step S2203), the packet is discarded in step S2204.

On the other hand, if the port number and the end point IP address correspond to the application part 210 (port number and virtual IP address specified by the application) in the control apparatus 200 (Yes in step S2203), the forwarding apparatus 300 transfers the packet to the data sending process part 360 in step S2205. Further, the data sending process part 360 retrieves a transfer destination control apparatus address corresponding to the port number and the end point IP address from the distribution table 343. Then, the data sending process part 360 converts the destination address of the packet to the transfer destination control apparatus address and transfers the packet to the control apparatus 200 in step S2206.

The data receiving process part 260 of the control apparatus receives the packet in step S2207, and searches the receiving table 243 to converts the destination IP address to the virtual IP address 223 and transfers the packet to the distributing part 250. In addition, the distributing part 250 specifies the communication port of the application part 210 from a communication port of the packet so as to send the packet to the application part in step S2209.

Procedure for Sending Data in Packet Processing System

Figure 30:
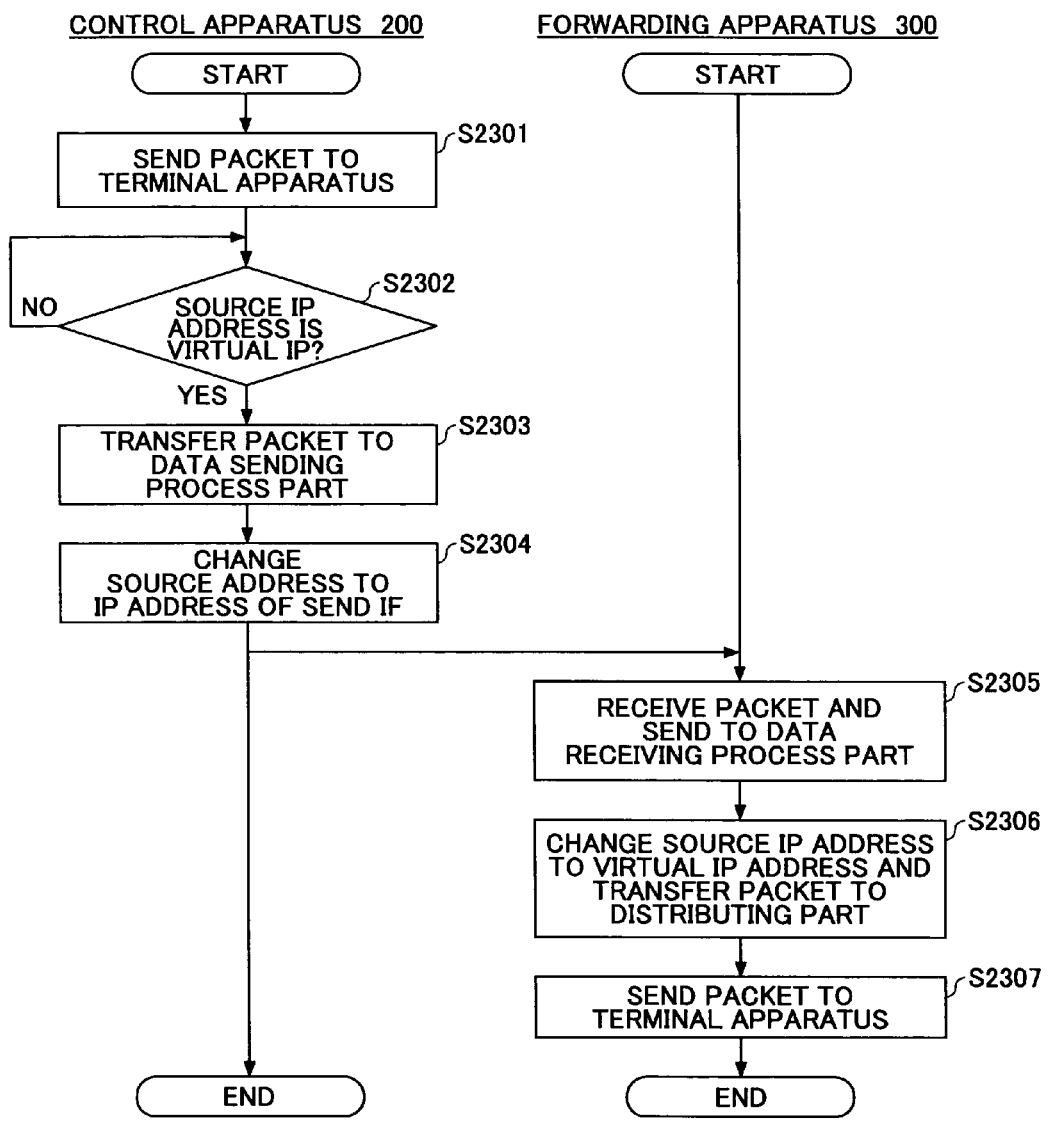
FIG. 30 is a flowchart showing the procedure for sending data in the packet processing system shown in FIG. 20.

Next, the procedure for sending data in the packet processing system shown in FIG. 20 is described. FIG. 30 is a flowchart showing the procedure.

First, the application part 210 sends a packet to a communication terminal apparatus in step S2301. Then, the distributing part 250 waits for a packet whose sending source address corresponds to the virtual IP address 223 in step S2302, and sends the packet to the data sending process part 270 when the packet arrives in step S2303. Further, the data sending process part 270 refers to the sending table 245 to converts the sending source address of the packet into the IP address of the control apparatus 200, and transfers the packet to the forwarding apparatus 300 in step 2304.

The data receiving process part 370 of the forwarding apparatus 300 receives the packet from the control apparatus in step S2305, searches the receiving table 345 to converts the sending source IP address into the virtual IP address 223 and transfers the packet to the distributing part 350 in step S2306. In addition, the distributing part 350 sends the packet from the network IF 390 to the communication terminal apparatus in step S2307.

Third Embodiment

In the first and second embodiments, a case where the packet processing system of the present invention is applied to a load balancer is described. However, application of the present invention is not limited to the load balancer. For example, the present invention can be applied to a router in which the control apparatus and the forwarding apparatus are separated. In the third embodiment, a case where the packet processing system of the present invention is applied to a router in which a control apparatus and a forwarding apparatus are separated. In this embodiment, after the configuration of the router is described, various procedures are described such as a procedure for generating an internal communication path between a virtual IF of the control apparatus and an interface of the forwarding apparatus.

Configuration of Packet Processing System

Figure 31:
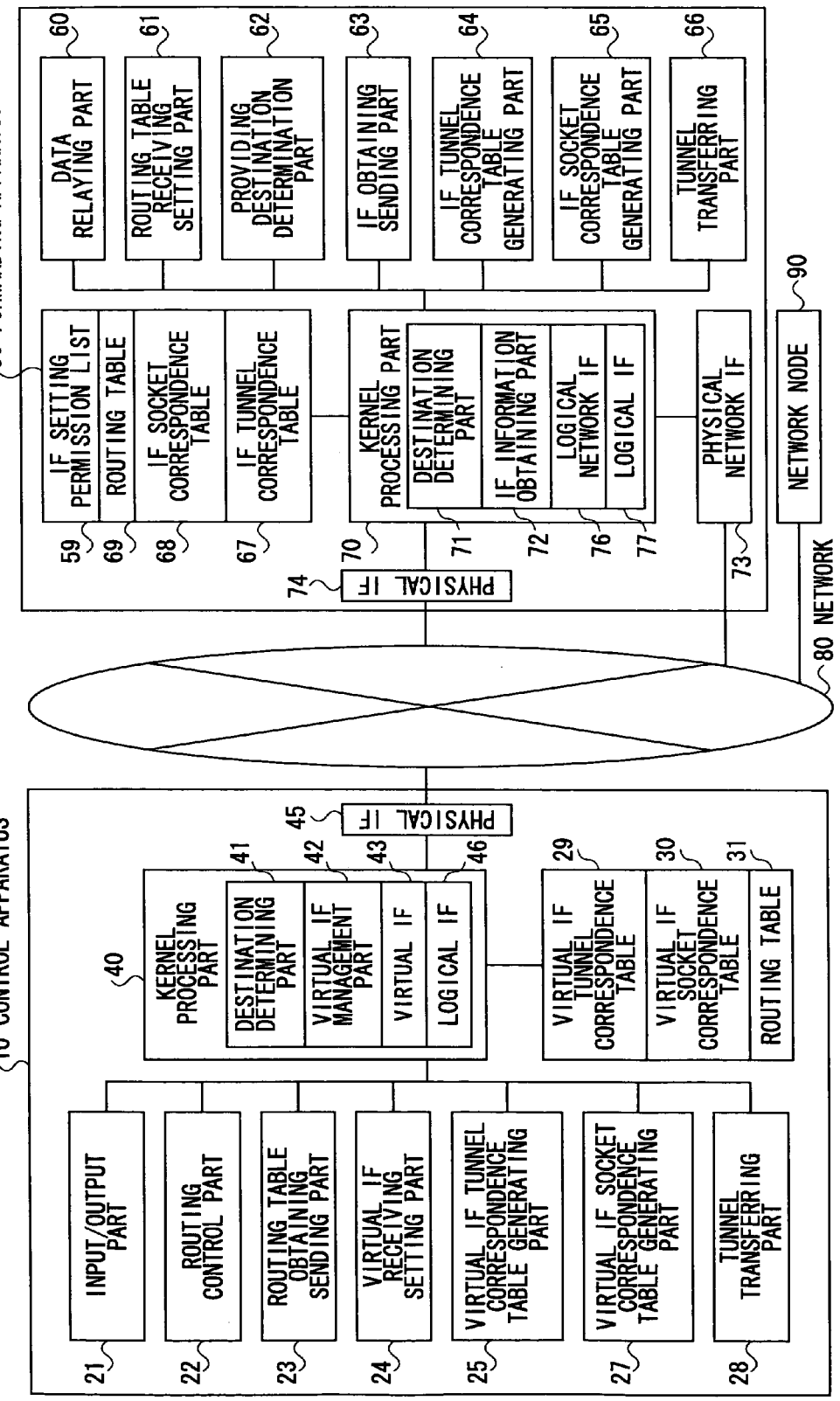
FIG. 31 is a functional block diagram showing the configuration of the packet processing system of the third embodiment.

FIG. 31 is a functional block diagram showing the configuration of the packet processing system of the third embodiment. As shown in FIG. 31, the packet processing system includes a control apparatus 10, a forwarding apparatus 50, a network 80 and a network node 90.

The network 80 is a communication network that enables data exchanges in accordance with communication protocols including equal to or higher than a data link layer. The network 80 may be formed by private lines or the Internet. For example, the router performs relaying and routing control for data packets according to a communication protocol of the network layer. The network node 90 is a communication apparatus such as a router connected to the network 80. In this embodiment, the network node 90 is an apparatus with which the control apparatus 10 communicates via the forwarding apparatus 50.

The control apparatus 10 is an apparatus that performs control functions of the router. The control apparatus 10 includes an input/output part 21, a routing control part 22, a routing table obtaining sending part 23, a virtual IF receiving setting part 24, a virtual IF tunnel correspondence table generation part 25, a virtual IF socket correspondence table generation part 27, a tunnel transferring part 28, a virtual IF tunnel correspondence table 29, a virtual IF socket correspondence table 30, a routing table 31, a kernel processing part 40 and an IF 45.

"IF" is an abbreviation of "interface". Logical IF and physical IF are collectively called as IF, except where specifically noted. Usually, a logical If and a physical IF forms a pair.

The input/output part 21 is an input/output device for inputting a command by a user and for outputting operation status of the control apparatus 10 and the forwarding apparatus 50, and a response for a command. More specifically, the input/output part 21 is a display apparatus such as a keyboard, a mouse, a CRT and a liquid crystal display, and a printer.

The routing control part 22 is an application process for communicating with the network node 90 via the network 80 and the forwarding apparatus 50, and performing routing control. More specifically, the routing control part 22 collects routing control information from the network node 90 according to a routing control protocol such as RIP (Routing Information Protocol) and OSPF (Open Shortest Path First), and performs routing calculation based on the collected routing control information so as to generate the routing table 31.

The routing table obtaining sending part 23 is a processing part for obtaining the routing table 31 generated by the routing control part 22 and sending the routing table 31 to the forwarding apparatus 50. More specifically, when the routing control part 22 notifies the kernel processing part 40 of update of the routing table 31, the kernel processing part 40 notifies the routing table obtaining sending part 23 of it. Then, the routing table obtaining sending part 23 obtains the routing table 31 and sends it to the forwarding apparatus via the IF 45.

The virtual IF receive setting part 24 receives a virtual IF setting command from the user, sends a request to use the logical network IF 76 to the forwarding apparatus. In addition, the virtual IF receive setting part 24 receives a determination result of usability and a corresponding downward tunnel identifier from the forwarding apparatus 50, and sets the virtual IF 43 on the control apparatus 10. In addition, the virtual IF receive setting part 24 notifies the tunnel transferring part 28 of completion of setting of the virtual IF 43.

The virtual IF tunnel correspondence table generating part 25 is a processing part for generating a virtual IF tunnel correspondence table 20 based on the downward tunnel identifier received from the forwarding apparatus 50. "Tunnel" means an internal communication path that connects between the control apparatus 10 and the forwarding apparatus 50. The data packet transmitted via the internal communication path is encapsulated with an identifier that identifies the internal communication path, and a destination of the data packet is specified.

The virtual IF socket correspondence table generating part 27 is a processing part for generating the virtual IF socket correspondence table 30 of internal communication paths connecting between the control apparatus 10 and the forwarding apparatus 50. More specifically, when the kernel processing part 40 detects that a destination of the socket made by the routing control part 22 is opened for the virtual IF 43, the kernel processing part 40 notifies the virtual IF socket correspondence table generation part 27 of it. The virtual IF socket correspondence table generation part 27 sends a socket address and an upward tunnel identifier to the IF socket correspondence generating part 65 in the forwarding apparatus to generate the virtual IF socket correspondence table 30.

When the tunnel transferring part 28 receives a notification notifying that setting of the virtual IF 43 has been completed from the virtual IF receive setting part 24, the tunnel transferring part 28 establishes the internal communication path. After the internal communication path is established, the tunnel transfer part 28 encapsulates a data packet received from the virtual IF 43 and sends the packet to the forwarding apparatus 50 on the basis of the virtual IF tunnel correspondence table 29 and the virtual IF socket correspondence table 30. In addition, the tunnel transfer part 28 decapsulates the data packet received from the forwarding apparatus 50 and transfers the packet to the virtual IF 43.

The virtual IF tunnel correspondence table 29 is a table in which virtual IF is associated with forwarding apparatus IP address/downward tunnel identifier. More particularly, the virtual IF tunnel correspondence table 29 is used for determining an internal communication path by which a data packet sent from the routing control part 22 is transmitted to the forwarding apparatus 50 from the virtual IF 43. The virtual IF socket correspondence table 30 is a table in which the upward tunnel identifier is associated with a socket address (IP address+port number) of virtual IF 43/routing control part 22. More particularly, the table is used for determining an virtual IF 43 that receives a data packet from an internal communication path through which the data packet received by the forwarding apparatus 50 is transferred to the virtual IF 43.

The routing table 31 is a table in which a destination IP address of a data packet is associated with an IP address of a next relay node. In other words, the routing table is a table for defining a shortest communication path to the destination of the packet that is obtained by routing control by the routing control process part 22.

The kernel processing part 40 is a kernel of the operating system and is a processing part for performing file management, memory management, and process execution control. More particularly, the kernel processing part 40 includes at least a destination determining part 41, a virtual IF management part 42 and a virtual IF 43. The destination determining part notifies the virtual IF socket correspondence table generating part 27 that a process opens a socket for the kernel processing part 40.

The virtual IF management part 42 is a processing part for managing the virtual IF 43. In addition, the virtual IF 43 has attribute information same as logical IF obtained from the logical network IF 76 of the forwarding apparatus 50 by the virtual IF receiving setting part 24. Since the IF is virtually set separately from the physical IF, the IF is called the virtual IF.

The physical IF 45 for communication between apparatuses is a physical IF used for the control apparatus 10 to communicate with the forwarding apparatus 50. In addition, the logical IF 46 for communication between apparatuses is used for the control apparatus 10 to communicate with the forwarding apparatus 50 via the network 80. More particularly, the IF is a communication IF such as the Ethernet 10BASE-T and RS-232C having a device driver.

The forwarding apparatus 50 is an apparatus that performs relay functions of the router. The forwarding apparatus 50 includes a data relaying part 60, a determining table receive setting part 61, a providing destination determining part 62, an IF obtaining sending part 63, an IF tunnel correspondence table generating part 64, an IF socket correspondence table generation part 65, a tunnel transferring part 66, an IF setting permission list 59, an IF tunnel correspondence table 67, an IF socket correspondence table 68, a routing table 69, a kernel processing part 79, a physical network F 73 and a physical IF 74 for communication between apparatuses.

The data relaying part 60 is a processing part for sending a received data packet to a next destination. More particularly, if the destination determining part 71 in the kernel processing part 70 determines that the received packet is one that should be transferred to other apparatus from the header of the data packet, the destination determining part 71 notifies the data relaying part 60 of it, and the data relaying part 60 sends the packet to a next destination based on the routing table 69.

The route table receiving setting part 61 receives an entry of the routing table 31 sent by the route table obtaining sending part 23, and sets the entry in the routing table 69. When the providing destination determining part 62 receives a request for using the logical network IF 76 from the virtual IF receiving setting part 24 of the control apparatus 10, the providing destination determining part 62 determines whether use of the logical network IF 76 is permitted on the basis of the IF setting permission list 59. The IF obtaining sending part 63 obtains attribute information of logical IF from the logical network IF 76 managed by the IF information obtaining part 72 of the kernel processing part 70, and sends the attribute information to the virtual IF receiving setting part 24 of the control apparatus 10.

The IF tunnel correspondence table generating part 64 is a processing part for sending a tunnel identifier to the virtual IF tunnel correspondence table generating part 25 of the control apparatus 10, and generating the IF tunnel correspondence table 67. The IF socket correspondence table generating part 65 receives a socket address and a tunnel identifier from the virtual IF socket correspondence table generating part 27 in the control apparatus 10 to generate the IF socket correspondence table 68.

The tunnel transferring part 66 encapsulates a data packet on the basis of the IF tunnel correspondence table 67 and the IF socket correspondence table 68, and sends the encapsulated packet to the control apparatus 10. In addition, the tunnel transferring part 66 decapsulates a data packet received from the control apparatus 10 and transfers the decapsulated packet to the logical network IF 76.

The tunnel correspondence table 67 is a table used for determining a logical IF 76 for outputting a packet from an internal communication path wherein the packet passes through the internal communication path when the packet is transferred from the control apparatus 10 to the forwarding apparatus 50. More particularly, the downward tunnel identifier is associated with the logical IF 76. In addition, the IF socket correspondence table 68 is a table used for determining an internal communication path used when a data packet received by the physical network IF 73 is transferred from the forwarding apparatus 50 to the control apparatus 10. More particularly, the IF socket correspondence table 68 is a table for associating the logical network IF 76/socket address with the upward tunnel identifier.

The routing table 69 is a table set by the routing table receiving setting part 61 that receives the routing table 31 sent from the route table obtaining sending part 23. More particularly, the routing table 69 is a table in which a destination IP address of a data packet is associated with a next hop IP address. The IP setting permission list 59 is a table in which destinations to which the logical network IF 76 of the forwarding apparatus 50 is to be provided are set beforehand. More particularly, the IF setting permission list 59 is a table in which the logical network IF 76 is associated with permitted control apparatus IP addresses.

The kernel processing part 70 is a kernel of the operating system, and performs file management, memory management and process execution control. More particularly, the kernel processing part 70 includes a destination determining part 71, an IF information obtaining part 72, a logical network IF 76, an IF 77 for communication between apparatuses. The destination determining part 71 is a processing part for determining a destination of a data packet from the header of the data packet and notifying related processing parts of the destination as necessary. More particularly, the destination determining part 71 obtains an IP address of an IP header of a data packet, reads a destination port number from the TCP header to determine the destination.

The IF information obtaining part 72 is a processing part for managing the logical network IF 73. The logical network IF 76 is a logical IF corresponding to the physical network IF 73, and forms a network IF with the physical network IF 73 as a pair.

The physical network IF 73 is an IF used for the forwarding apparatus 50 to communicate with the network node 90 or the control apparatus 10 via the network 80. The IF 74 for communication between apparatuses is an IF used for the apparatus 50 to communicate with the control apparatus 10 via the network 80 by using data packets. More particularly, the IF is Ethernet 10BASE-T, RS-232C or the like.

Like the first and second embodiments, the forwarding apparatus 50 may include the port number issuing part and the port number pool table.

Figure 32:
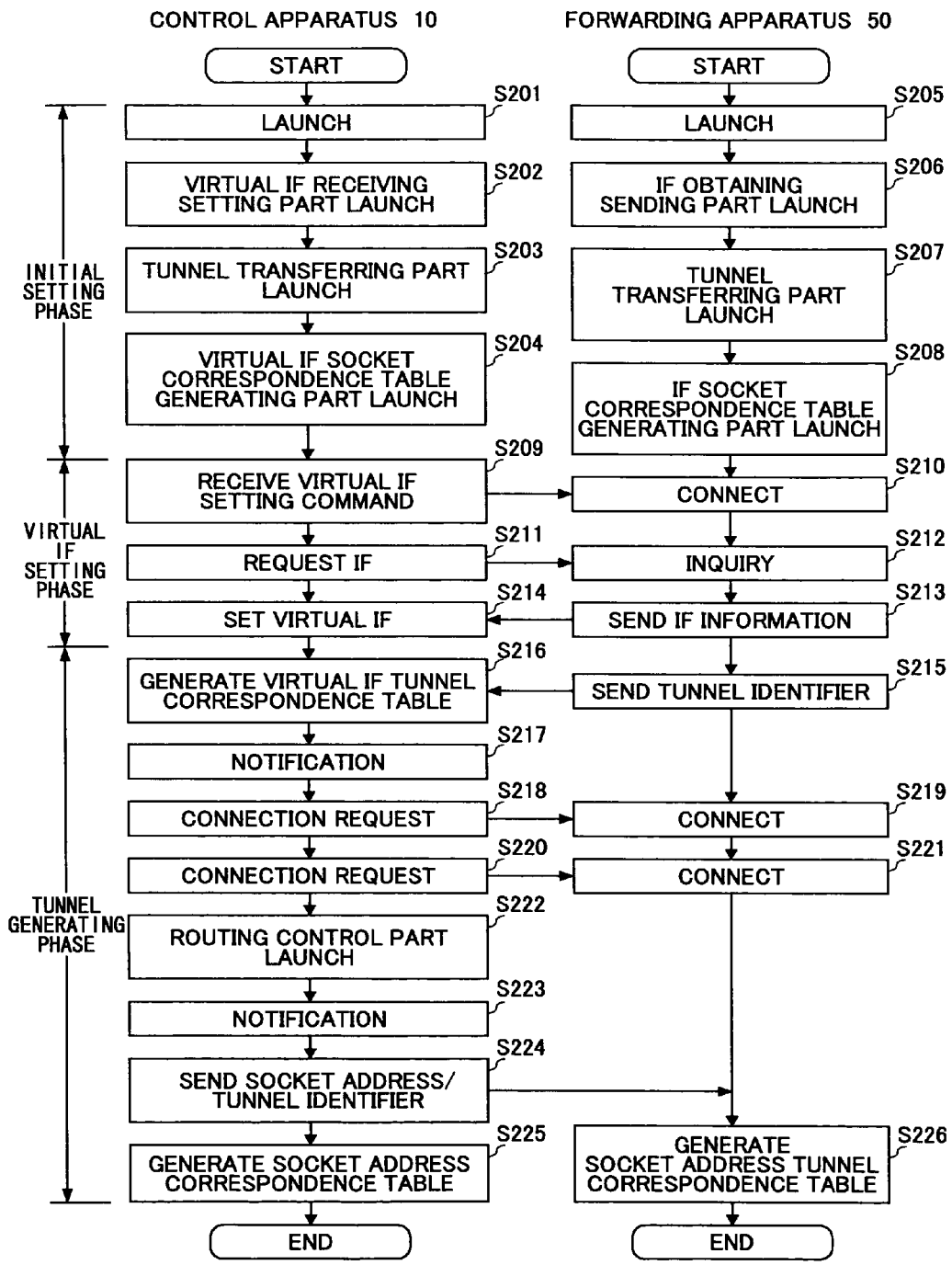
FIG. 32 is a flowchart showing the procedure for setting a virtual IF and generating the internal communication path in the packet processing system shown in FIG. 31.

Process Procedure for Setting Virtual If and Generating Internal Communication Path Next, the process procedure for setting a virtual IF and generating the internal communication path in the packet processing system shown in FIG. 31 is described. FIG. 32 is a flowchart showing the procedure. As shown in the figure, the procedure includes an initial setting phase (steps S201-S208), a virtual IF setting phase (steps S209-S214), and a tunnel generating phase (steps S215-S226).

In the initial setting phase, the control apparatus 10 and the forwarding apparatus 50 launches each processing part. When the control apparatus 10 is started in step S201, the virtual IF receiving setting part 24, the tunnel transferring part 28, and the virtual IF socket correspondence table generating part 27 are launched in this order (steps S202-S204). In synchronization with this, a part of the internal communication path is generated for generating a tunnel. The part of the internal communication path is virtual IF receiving setting part 24<->virtual IF management part 42 (step S202), and virtual IF socket correspondence table generating part 27<->destination determining part 41 (step S204).

In the same way, when the forwarding apparatus 50 is started in step S205, the IF obtaining sending part 63, the tunnel transferring part 66 and the IF socket correspondence table generating part 65 are launched in this order (steps S206-S208). In synchronization with this, a part of the internal communication path is generated for generating a tunnel. The part of the internal communication path is IF obtaining sending part 63<->IF information obtaining part 72 (step S206), IF obtaining sending part 63<->IF 74 (step S206), tunnel transferring part 66<->IF 74 (step S207), tunnel transferring part 66<->destination determining part 71 (step S207), and IF socket correspondence table generating part 65<->IF 74 (step S208).

After the initial setting phase, the virtual IF setting phase starts. First, when the virtual IF receiving setting part 24 receives a virtual IF setting command, the virtual IF receiving setting part 24 establishes an internal communication path (virtual IF receiving setting part 24<->IF 45 for communication between apparatuses), and starts communication with the IF obtaining sending part 63 of the forwarding apparatus 50 (steps S209-S210).

The virtual IF receiving setting part 24 requests to use the logical network IF 76 of the forwarding apparatus 50 in step S211. The IF obtaining sending part 63 of the forwarding apparatus 50 that receives the request inquires of the providing destination determining part 62 whether use of the logical network IF 76 can be permitted. In addition, the providing destination determining part 62 determines whether the logical network IF 76 can be provided on the basis of the predetermined IF setting permission list 59, and sends a response to the IF obtaining sending part in step S212.

Next, the IF obtaining sending part 63 sends attribute information of the logical network IF 76 to the virtual IF receiving setting part 24 in step S213. Then, the virtual IF receiving setting part 24 transfers the received attribute information to the virtual IF management part 42 in the kernel processing part 40 so as to set the virtual IF 43 and the internal communication path (destination determining part 41<->virtual IF 43) in step S214.

Figure 33:
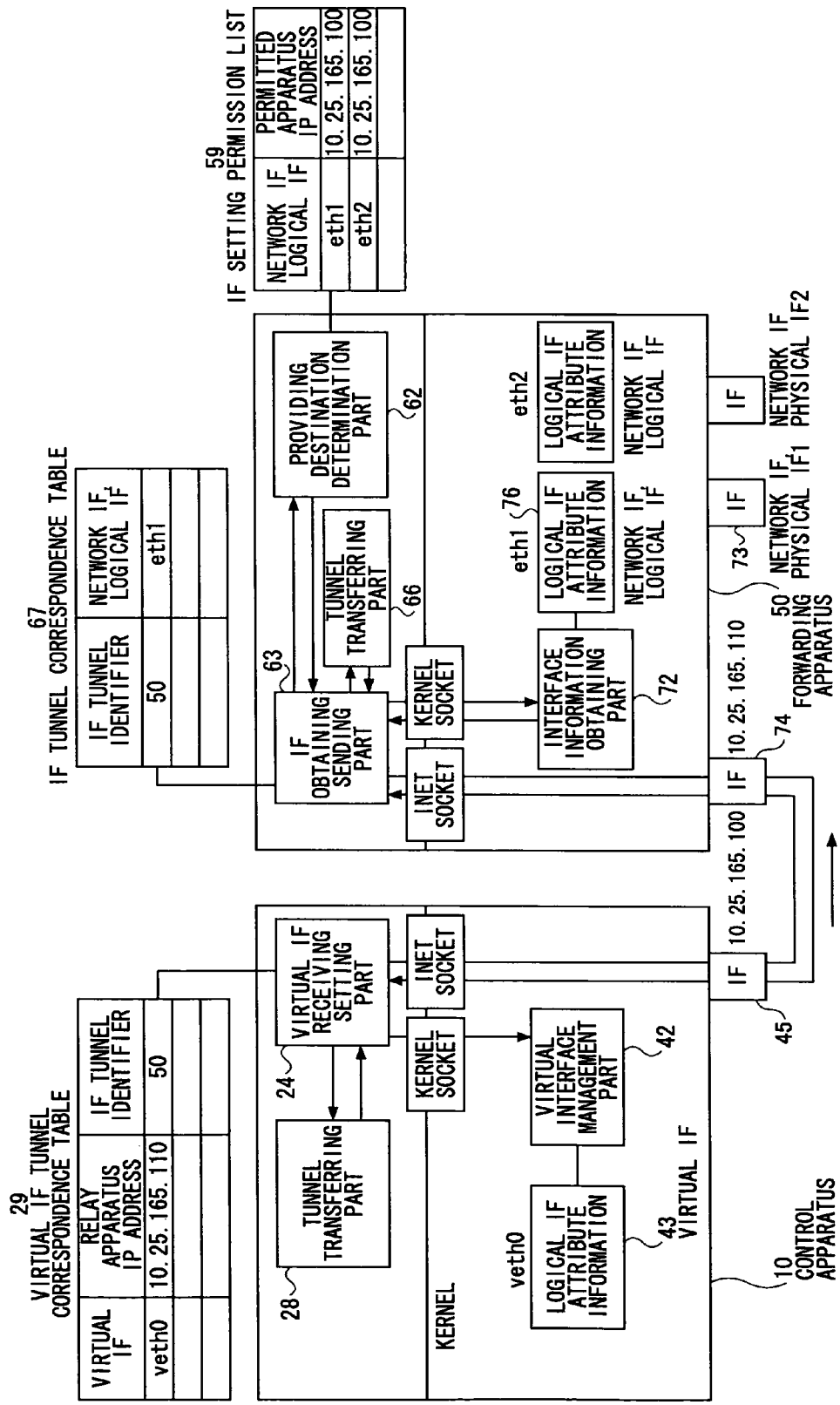
FIG. 33 shows an example of the internal communication path in the virtual IF setting phase in the packet processing system.

In the following, an example of the internal communication path in the virtual IF setting phase in the packet processing system is described in detail. FIG. 33 shows the example. As shown in the figure, in the virtual IF setting phase, the virtual IF receiving setting part 24 and the IF obtaining sending part 63 connects the virtual IF 43 and the logical network IF 76 via an internal communication path, and the virtual IF 43 is set.

Then, the virtual IF receiving setting part 24 sends the virtual IF tunnel correspondence table 29 to the tunnel transferring part 28, and the IF obtaining sending part 63 sends the IF tunnel correspondence table 67 to the tunnel transferring part 66. Each of the virtual IF tunnel correspondence table 29 and the IF tunnel correspondence table 67 is a table that is generated in the next tunnel generating phase. The IF setting permission list 59 is a table set beforehand by a user.

After the virtual IF setting phase ends as mentioned above, the IF tunnel correspondence table generating part 64 of the forwarding apparatus 50 sends a downward tunnel identifier of a tunnel to the virtual IF tunnel correspondence table generating part 25, wherein the tunnel is for transferring a data packet from the control apparatus 10 to the forwarding apparatus 50. In addition, the IF tunnel correspondence table generating part 64 generates the IF tunnel correspondence table 67 in step S215. On the other hand, the virtual IF correspondence table generating part 25 of the control apparatus 10 generates the virtual IF tunnel correspondence table 29 on the basis of the received downward tunnel identifier in step S216.

After the virtual IF receiving setting part 24 sets the virtual IF 43, the virtual IF receiving setting part 24 notifies the tunnel transferring part 28 of it in step S217. The transferring part 28 that received the notification generates a part of the internal communication path (tunnel transferring part 28<->IF 45, tunnel transferring part 28<->virtual IF 43) so as to request connection to the tunnel transferring part 66 of the forwarding apparatus 50, so that the tunnel transferring part 28 is connected to the tunnel transferring part 66 of the forwarding apparatus 50 (steps S218-S219).

Then, the virtual IF socket correspondence table generating part 27 generates an internal communication path (virtual IF socket correspondence table generating part 27<->IF 45) so as to start to communicate with the IF socket correspondence table generating part 65 of the forwarding apparatus 50 (steps S220-S221). In addition, at the same time when the routing control part 22 is launched, an internal communication path (routing control part 22<->destination determining part 43) is generated in step S222. In addition, when the routing control part 22 opens a socket for the virtual IF 43, the destination determining part 41 notifies the virtual socket correspondence generating part 27 of the opening of the socket in step S223.

Next, the virtual IF socket correspondence table generating part 27 sends an upward tunnel identifier of an upward tunnel and a socket address of the routing control part 22 to the IF socket correspondence table generating part 65 (step S224), and generates a virtual IF socket correspondence table 30 in steps S225. At the same time, the IF socket correspondence generating part 65 generates an IF socket correspondence table 68 in step S226.

Figure 34:
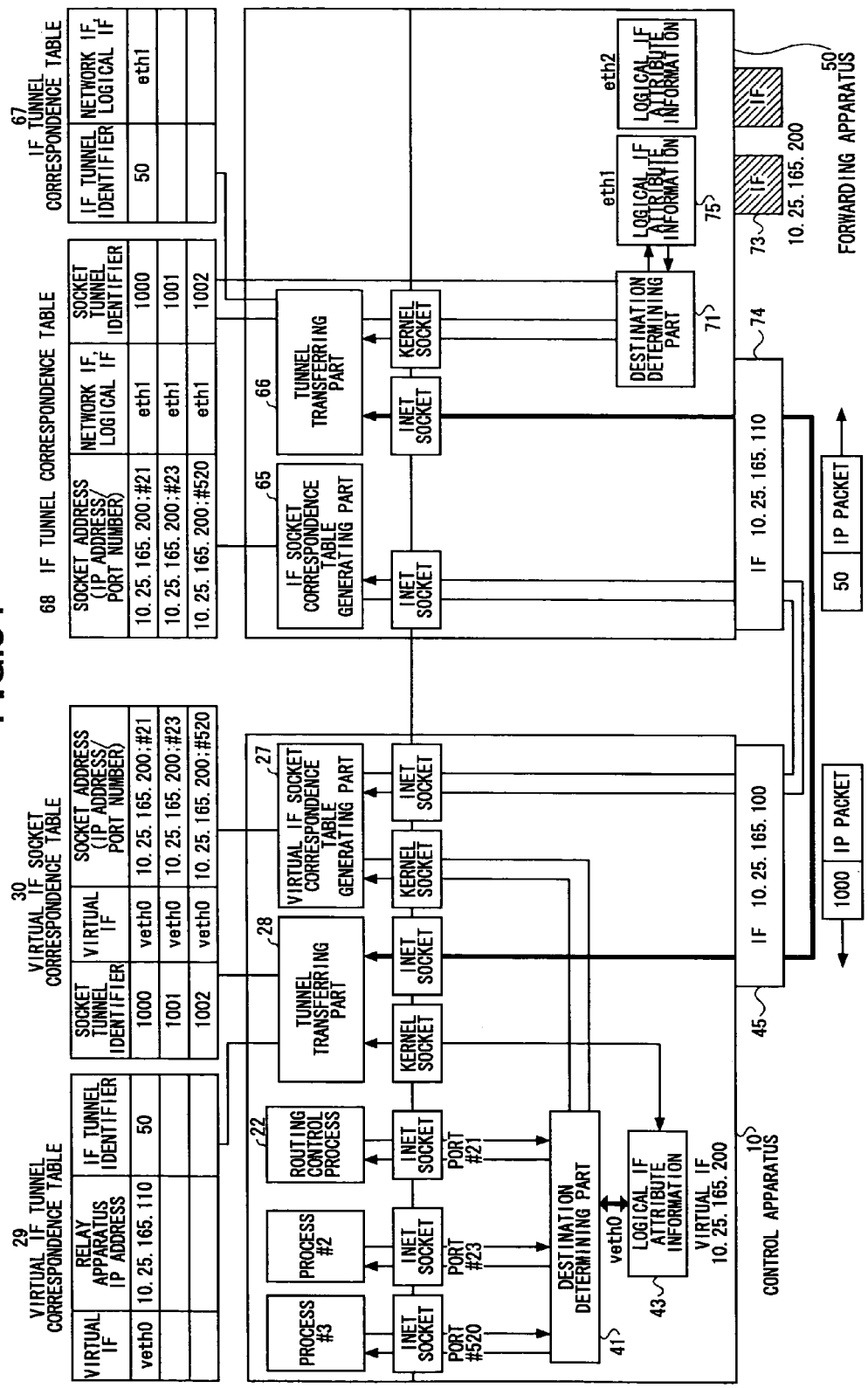
FIG. 34 shows an example of the internal communication path in the tunnel generating phase in the packet processing system.

In the following, an example of the internal communication path in the tunnel generating phase in the packet processing system is described in detail. FIG. 34 shows the example. As shown in the figure, the tunnel transferring parts 28 and 66 connects the virtual IF 43 in the control apparatus and the logical network IF 76 via internal communication paths. Communications between a process of the control apparatus 10 and the virtual IF are extended to the logical network IF 76 of the forwarding apparatus, so that the process can communicate with the network node 90. Each of the virtual IF socket correspondence table 30 and the IF socket correspondence table 68 is a table for defining internal communication paths used for transferring a data packet from the forwarding apparatus 50 to the control apparatus 10. The tables are generated by the virtual IF socket correspondence table generating part 27 and the IF socket correspondence table generating part 65.

Figure 35:
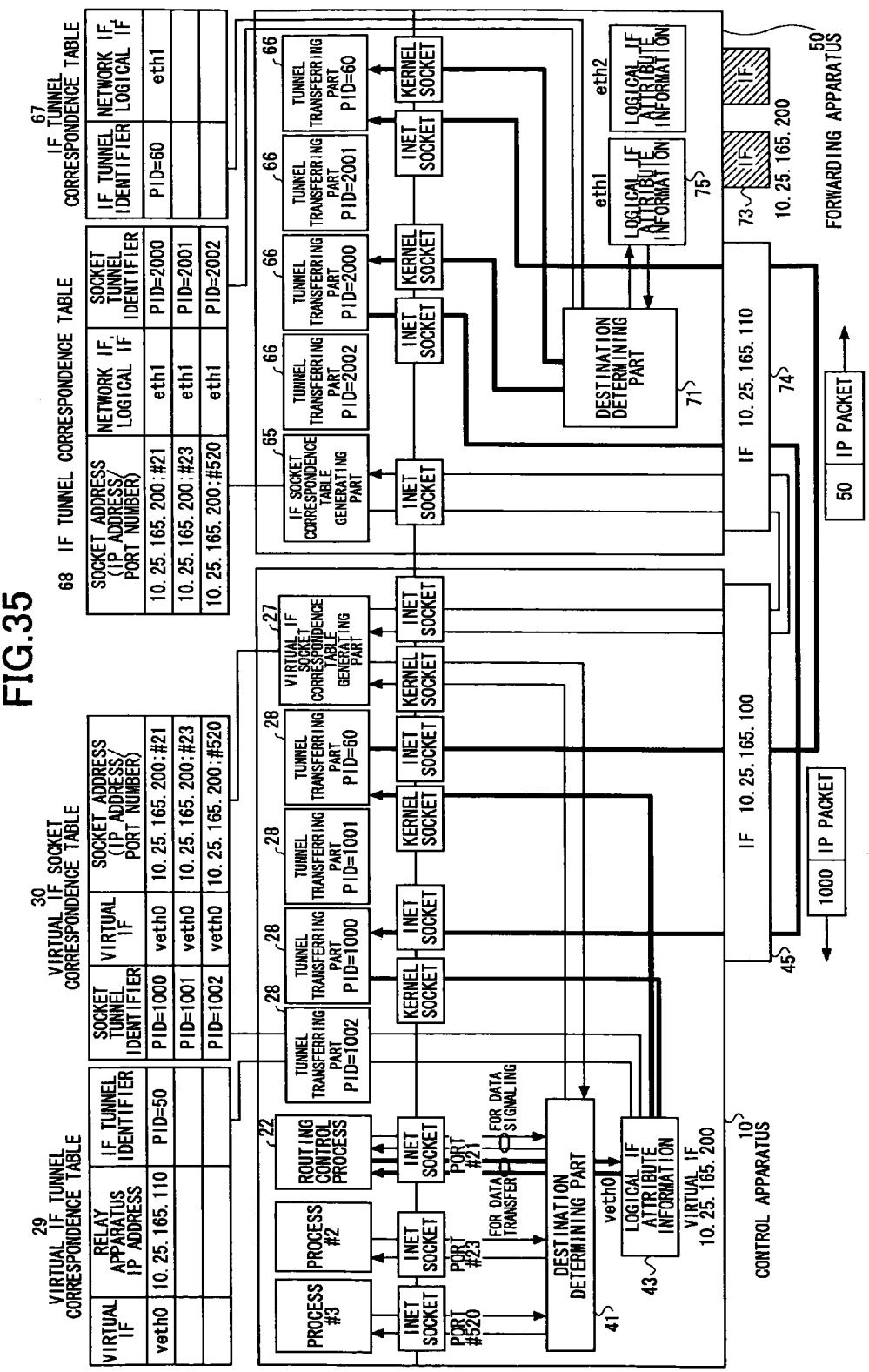
FIG. 35 shows another example of internal communication paths in the tunnel generating phase in the packet processing system shown in FIG. 31.

FIG. 35 shows another example of internal communication paths in the tunnel generating phase in the packet processing system shown in FIG. 31. In this example, each of a plurality of processes in the control apparatus generates a tunnel. However, the procedure for generating the internal communication path is the same as that of the before-mentioned example.

As mentioned above, when the control apparatus 10 receives a notification notifying that a process starts to communicate with the virtual IF 43, the destination determining part 41 notifies the virtual IF socket correspondence table generating part 27 of generating an internal communication path, and, then, the virtual IF socket correspondence table generating part 27 sends a socket address of the process and an upward tunnel identifier to the forwarding apparatus 50, and generates the virtual IF socket correspondence table 30 for associating the upward tunnel identifier, virtual IF 43 and the socket address with each other. The forwarding apparatus 50 generates the IF socket correspondence table 68 for associating the socket address, the upward tunnel identifier and the logical network IF 76 with each other. Therefore, a packet processing system at least compatible with existing routing control protocol software in which the internal communication path can be generated between the virtual IF 43 in the control apparatus and the logical network IF 76 in the forwarding apparatus 50 can be provided.

Procedure for Transferring Received Packet

Figure 36:
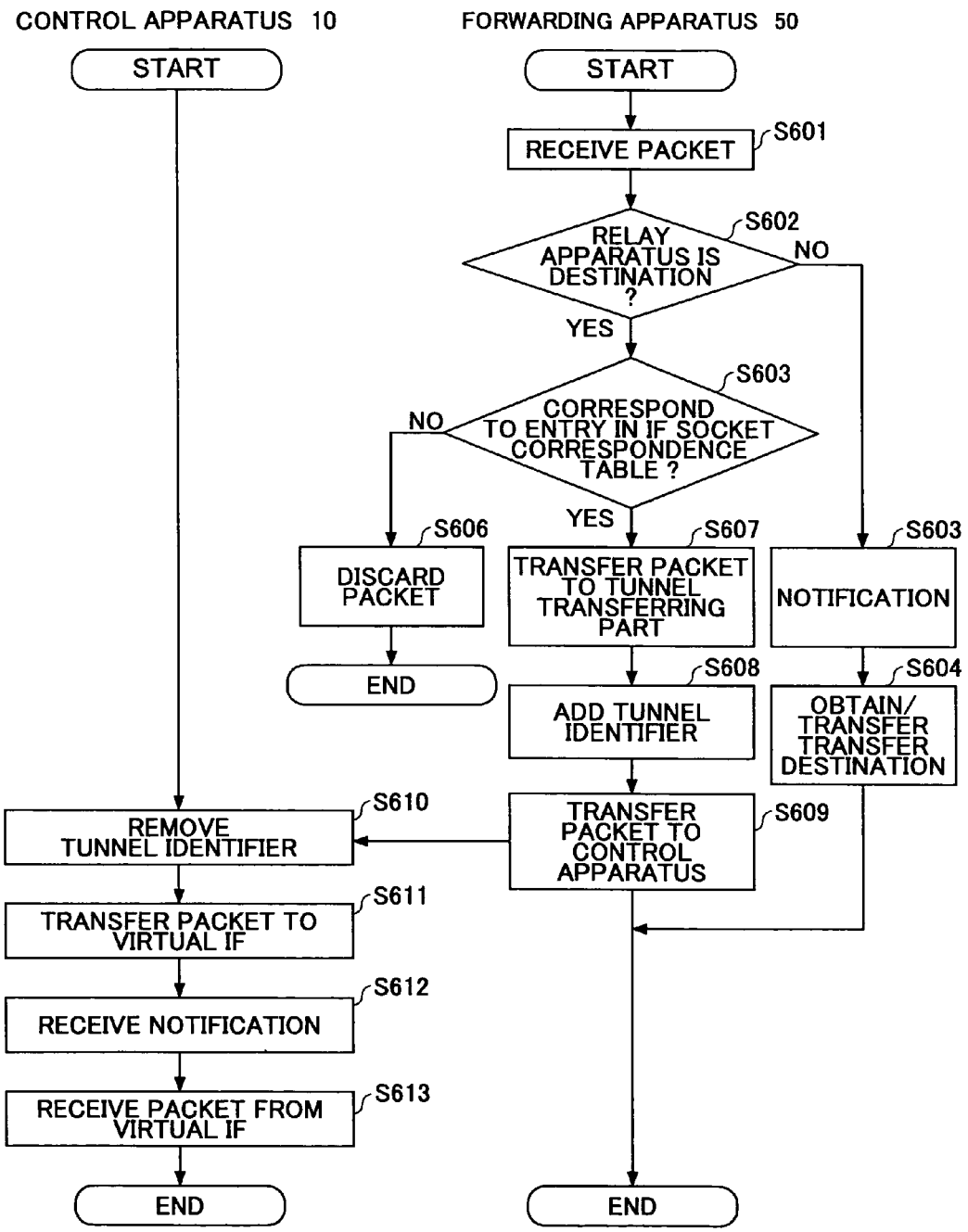
FIG. 36 shows a flowchart of the procedure for transferring a received packet in the packet processing system shown in FIG. 31.

In the following, the procedure for transferring a received packet in the packet processing system shown in FIG. 31 is described. FIG. 36 shows a flowchart of the procedure.

As shown in the figure, when the forwarding apparatus 50 receives a data packet from the network node 90 by using the physical network IF 73 in step S601, the destination determining part 71 determines the destination of the data packet from the header and determines whether the data packet should be received by the forwarding apparatus 50 in step S602. If the destination is not the forwarding apparatus (No in step S602), the destination determining part 71 notifies the data relaying part 60 of it in step S603. The data relaying part 60 obtains a transferring destination of the data packet from the routing table 69 and transfers the packet in step S604.

On the other hand, if the destination is the forwarding apparatus (Yes in step S602), the destination determining part 71 refers to the IF socket correspondence table 68 to determine if the packet corresponds to an entry of the IF socket correspondence table in step S605. If the packet does not correspond to any entry (if port number does not correspond to any port number of sockets opened by the routing control part 22 in this embodiment)(no in step S603), the data packet is discarded in step S606. On the other hand, if the packet corresponds to an entry in the IF socket correspondence table 68 (Yes in step S603), the destination determining part 71 notifies the tunnel transferring part 66 of the receipt of the data packet in step S607.

Then, the tunnel transferring part 66 receives the data packet from the logical network IF 76, and encapsulating the packet by adding an upward tunnel identifier on the basis of the IF socket correspondence table 68 in step S608. Further, the tunnel transferring part 66 transfers the data packet to the tunnel transferring part 28 in the control apparatus 10 in step S609.

Then, after the tunnel transferring part 28 receives the data packet, the tunnel transferring part 28 removes the tunnel identifier in step S610, and transfers the data packet to the virtual IF 43 on the basis of the tunnel identifier and the virtual IF socket correspondence table 30 in step S611. When the virtual IF 43 receives the data packet, the kernel processing part 40 reads the port number from the header of the data packet, and notifies the routing control part 22 of the arrival of the data packet in step S612. Then, the routing control part 22 receives the data packet from the virtual IF 43 in step S613.

As mentioned above, the forwarding apparatus 50 encapsulates the data packet received from the logical network IF 76 on the basis of the IF socket correspondence table 68, sends the packet to the control apparatus. The control apparatus 10 decapsulates the data packet received from the forwarding apparatus on the basis of the virtual IF socket correspondence table 30, and transfers the packet to the virtual IF 43. Therefore, a packet processing system at least compatible with existing routing control protocol software in which the internal communication path can be generated between the virtual IF 43 in the control apparatus and the logical network IF 76 in the forwarding apparatus 50 can be provided.

Procedure for Transferring a Sending Packet

Figure 37:
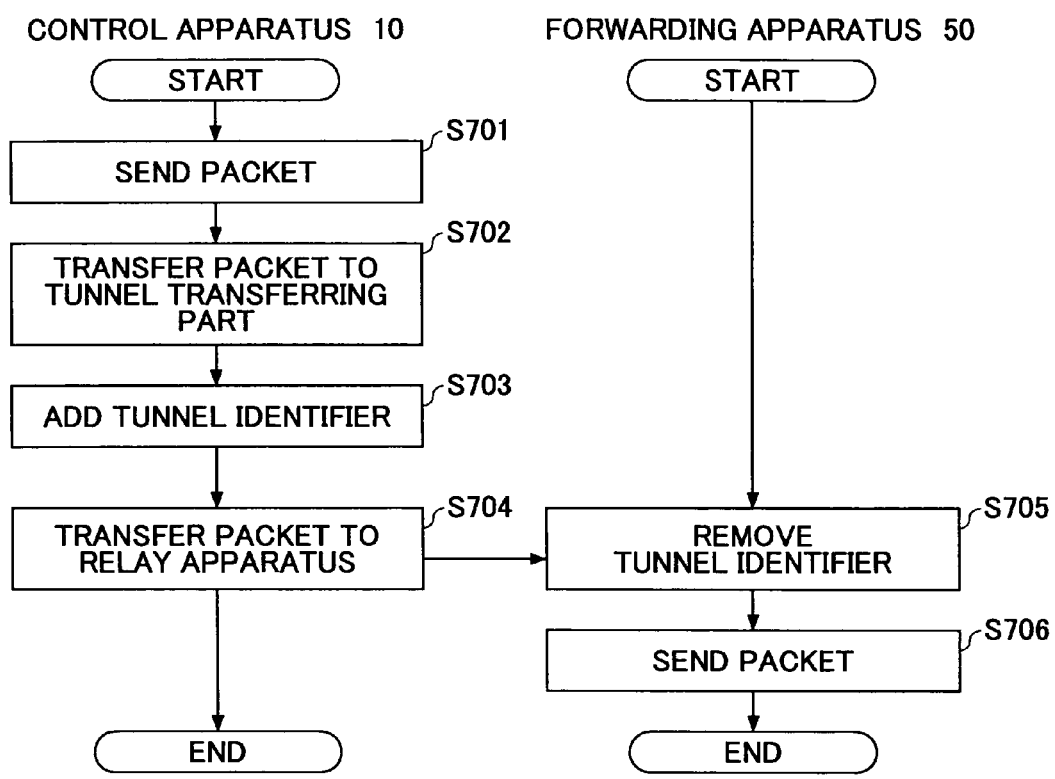
FIG. 37 shows a flowchart of the procedure for transferring a sending packet in the packet processing system shown in FIG. 31.

Next, the procedure for transferring a sending packet in the packet processing system shown in FIG. 31 is described. FIG. 37 shows a flowchart of the procedure.

As shown in the figure, the routing control part 22 sends the data packet to the virtual IF 43 in step S701. Then, the virtual IF 43 receives the data packet, and transfers the data packet to the tunnel transferring part 28 in step S702.

Then, the tunnel transferring part 28 adds a tunnel identifier on the basis of the virtual IF tunnel correspondence table 29 to encapsulate the packet in step S703. In addition, the tunnel transferring part 28 transfers the data packet to the tunnel transferring part 66 of the forwarding apparatus 50 in step S704. Then, the tunnel transferring part 66 of the forwarding apparatus 50 receives the data packet, refers to the IF tunnel correspondence table 67 and removes the tunnel identifier in step S705. Further, the tunnel transferring part 66 sends the data packet from the physical network IF 73 that corresponds to the tunnel identifier in step S706.

As mentioned above, the control apparatus 10 encapsulates the data packet received from the virtual IF 43 on the basis of the virtual IF tunnel correspondence table 29 and sends the packet to the forwarding apparatus 50. The forwarding apparatus decapsulates the data packet received from the forwarding apparatus 10, and transfers the packet to the logical network IF 76. Therefore, a packet processing system at least compatible with existing routing control protocol software in which the internal communication path can be generated between the virtual IF 43 in the control apparatus and the logical network IF 76 in the forwarding apparatus 50 can be provided.

Fourth Embodiment

In the third embodiment, procedures for generating the internal communication paths when the packet processing system of the present invention starts communication is described. However, the present invention is not limited to that embodiment. The present invention can be also applied to procedure for deleting the internal communication paths when the packet processing system ends communication. In this embodiment, the procedure for deleting the internal communication paths when the packet processing system ends communication is described.

Configuration of Packet Processing System

Figure 38:
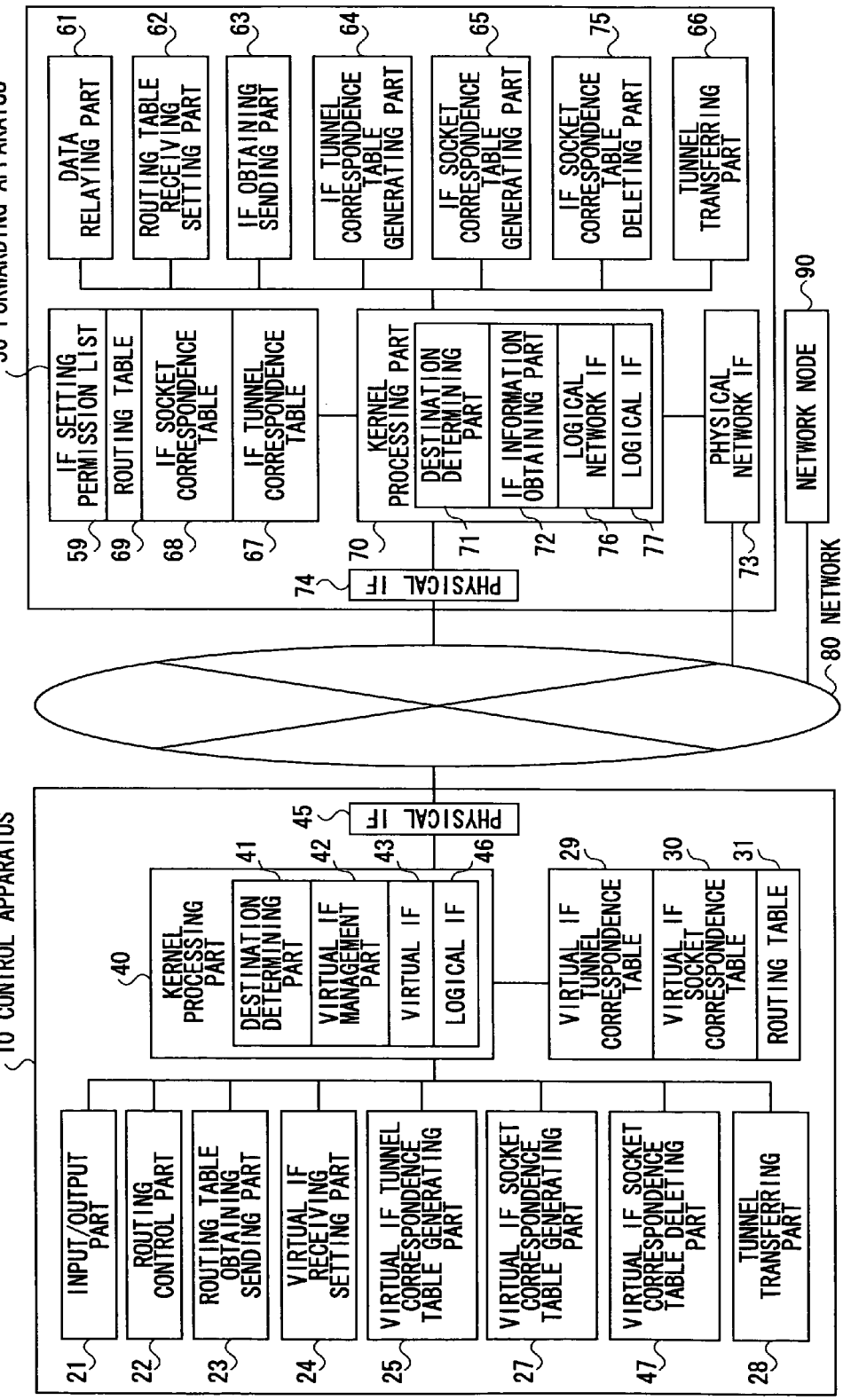
FIG. 38 is a functional block diagram of the packet processing system of the fourth embodiment.

FIG. 38 is a functional block diagram of the packet processing system of the fourth embodiment. As shown in the figure, following processing parts are added to the configuration of the third embodiment for deleting internal communication paths when a process in the control apparatus ends.

When the routing control part 22 ends communication and deletes a socket, a virtual IF socket correspondence table deleting part 47 of the control apparatus 10 deletes a corresponding part of the virtual IF socket correspondence table 30 in response to receiving an instruction to do so from the destination determining part 41. In addition, the IF socket correspondence table deleting part 75 of the forwarding apparatus 50 deletes a corresponding part of the IF socket correspondence table 68 when receiving an instruction to do so from the virtual IF socket correspondence table deleting part 47. The virtual IF socket correspondence table deleting part 47 and the IF socket correspondence table deleting part 75 are connected each other beforehand in the same way as a case where the virtual IF socket correspondence table generating part 27 and the IF socket correspondence table generating part 65 generate an internal communication path.

Procedure for Deleting Internal Communication Path

Figure 39:
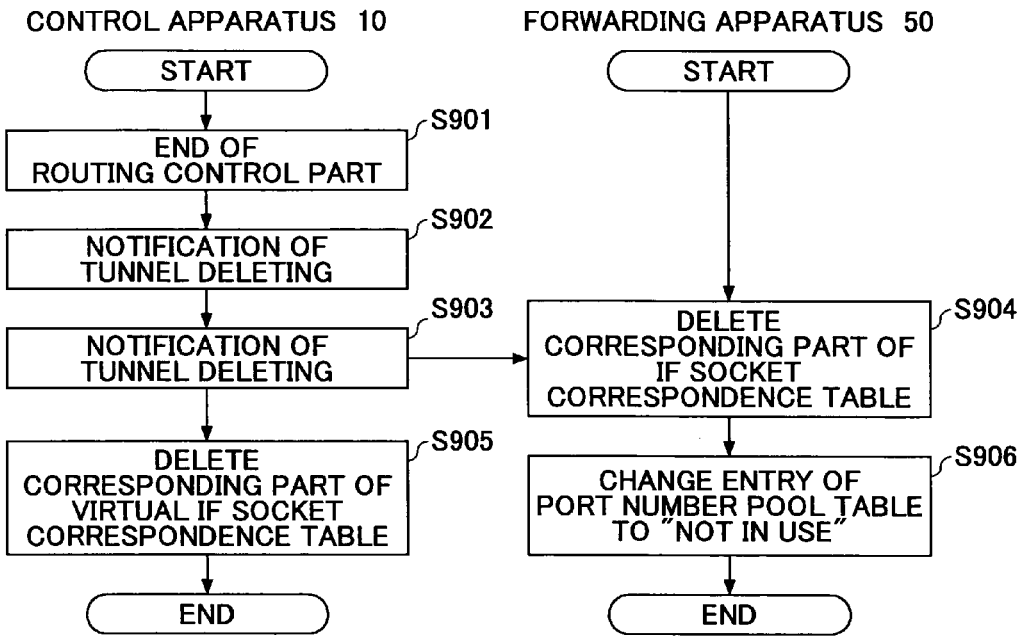
FIG. 39 is a flowchart of the procedure for deleting the internal communication path.

Next, the procedure for deleting the internal communication path is described. FIG. 39 is a flowchart of the procedure. As shown in the figure, the routing control part 22 of the control apparatus ends communication and closes a socket in step S901. Then, the destination determining part 41 detects that the routing control part 22 closed the socket, and instructs the virtual IF socket correspondence table deleting part 47 to delete a corresponding tunnel in step S902. The virtual IF socket correspondence table deleting part 47 receives the instruction and instructs the IF socket correspondence table deleting part 75 of the forwarding apparatus 50 to delete the corresponding part of the IF socket correspondence table 68 in step S903.

Then, the IF socket correspondence table deleting part 75 deletes the corresponding part of the IF socket correspondence table 68 in step S904. Further, the virtual IF socket correspondence table deleting part 47 deletes a corresponding part of the virtual IF socket correspondence table 30 in step S905. When the port number issuing part and the port number pool table are provided, the IF socket correspondence table deleting part 75 notifies the port number issuing part of the end of the process, and the port number issuing part changes a corresponding entry of the port number pool table into "not in use" from "in use" in step S906.

As mentioned above, when the process ends, the control apparatus 10 detects the socket is closed in the destination determining part 41, and the virtual IF socket correspondence table deleting part 47 request the forwarding apparatus 50 to delete the corresponding part of the virtual IF socket correspondence table 30. In addition, the IF socket correspondence table deleting part 74 deletes the corresponding part of the IF socket correspondence table 65. Therefore, a packet processing system at least compatible with existing routing control protocol software in which the internal communication path between the virtual IF 43 in the control apparatus and the logical network IF 76 in the forwarding apparatus 50 can be always updated can be provided.

Fifth Embodiment

The packet processing system and the packet processing method described in the first-fourth embodiments can be realized by executing a program in a computer system such as a personal computer and a workstation.

Figure 40:
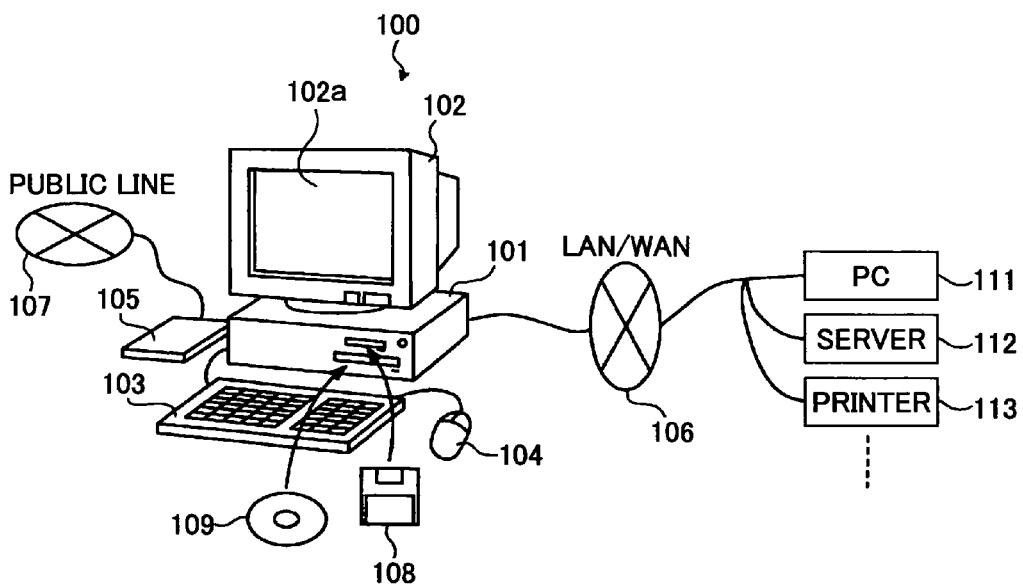
FIG. 40 is a system block diagram showing a configuration of the computer system of the fifth embodiment.
Figure 41:
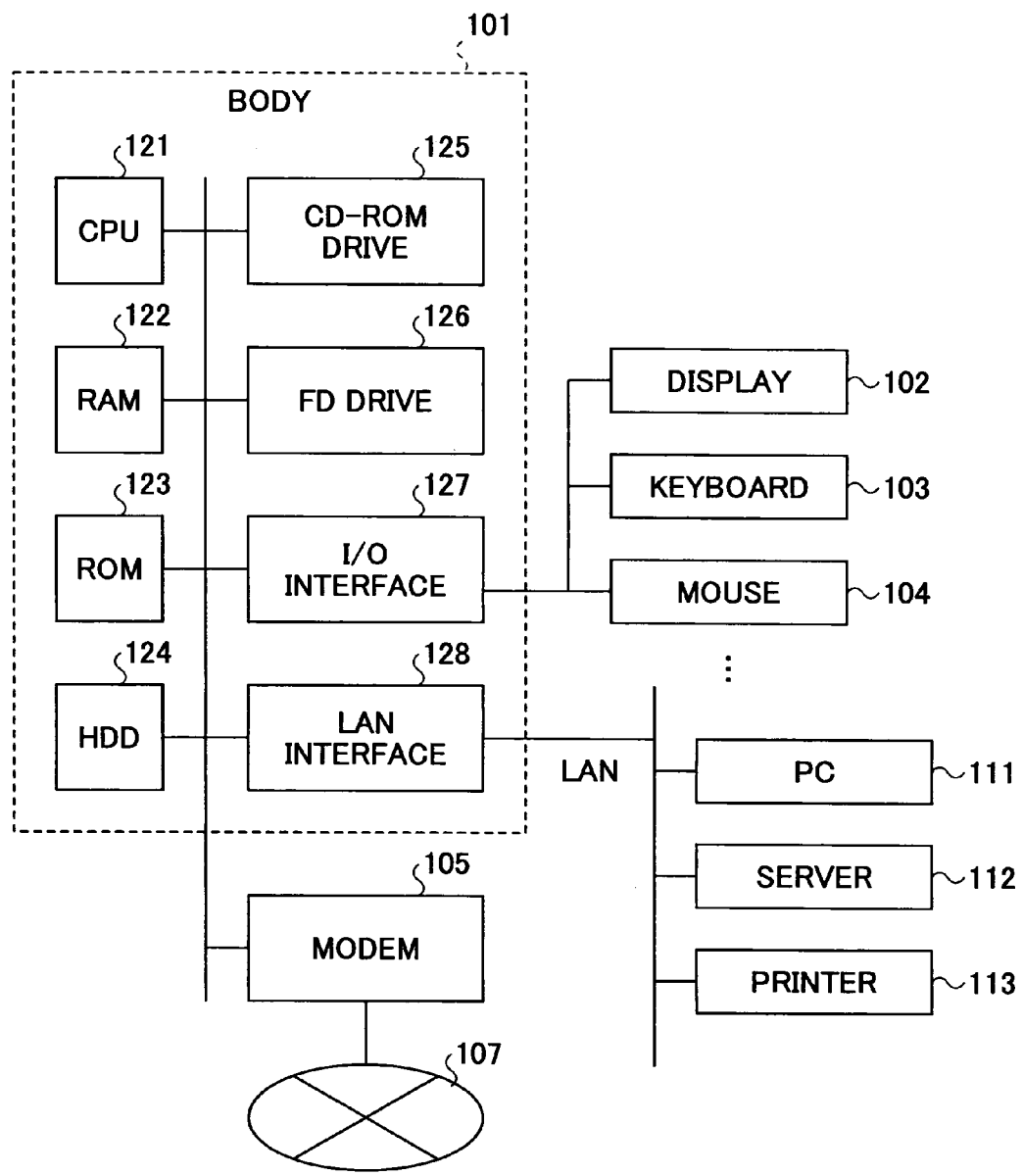
FIG. 41 is a block diagram showing the configuration of the body of the computer system.

FIG. 40 is a system block diagram showing a configuration of the computer system of the fifth embodiment. FIG. 41 is a block diagram showing the configuration of the body of the computer system. As shown in FIG. 40, the computer system 100 includes the body 101, a display 102 for displaying information such as an image on a display screen 102a according to instructions from the body 101, a keyboard 103 for inputting various information in the computer system 100, and a mouse 104 for specifying any position on the display screen 102a.

As shown in FIG. 41, the body 101 includes a CPU 121, a RAM 122, a ROM 123, a hard disk drive (HDD) 124, a CD-ROM drive 125 for setting a CD-ROM 109, a FD drive 126 for setting a flexible dusk (FD) 108, an I/O interface 127 for connecting a display 102, a keyboard 103 and a mouse 104, and a LAN interface 128 for connecting to a local area network or a wide area network (LAN/WAN).

The computer system 100 includes a modem 105 to connect to a network 107 such as the Internet, and the computer system 100 can connects to other computer system 111, a server 112 and a printer 113 and the like.

In addition, the computer system 100 reads and executes a packet processing program stored in a recording medium so that the packet processing system is realized. The recording medium includes various computer readable recording mediums. The recording medium may be a movable physical medium such as a flexible disk (FD) 108, a CD-ROM 109, a MO disk, a DVD disk, a magneto-optical disk, and an IC card. In addition, the recording medium may be a fixed physical medium such as the HDD 124, the RAM 122 and the ROM 123 provided in the inside or the outside of the computer system 100. Further, the recording medium may be a communication medium such as the LAN/WAN 106 that keeps the program while the program is transmitted.

That is the packet processing program is stored in the computer readable recording medium such as the movable physical medium, the fixed physical medium and the communication medium. The packet processing program can be also executed by other computer 111 or the relay server 112. Or, a plurality of computers may cooperatively execute the packet processing program.

The present invention is not limited to the specifically disclosed embodiments, and variations and modifications may be made without departing from the scope of the present invention.

Although a case where the forwarding apparatus 50 and the network node 90 are connected to the same network is described in the third and fourth embodiments, the present invention is not limited to this. They may be connected to different networks.

Although a case where the symbol part is the virtual IF is described in the third and fourth embodiments, the present invention is not limited to this feature. For example, a file can be used. More particularly, an IF of the forwarding apparatus is associated with a file in a specific directory in the control apparatus, and a process in the control apparatus opens the file and reads/writes data, so that data can be sent and received via a remote IF.

In addition, although a case where a plurality of processes in the control apparatus communicates with one of the logical network IFs in the forwarding apparatus is described in the third and fourth embodiments, the present invention is not limited to this, and a plurality of processes may communicate with a plurality of logical network IFs.

In addition, although one control apparatus and one forwarding apparatus cooperate with each other to extend communication between the process and the virtual IF of the control apparatus to the IF of the forwarding apparatus, the present invention is not limited to this. A plurality of control apparatuses and a plurality of forwarding apparatuses may cooperate with each other.

In each process described in the embodiments, the whole or a part of processes described to be performed automatically can be performed manually, or the whole or a part of processes described to be performed manually can be performed automatically by known methods. Process procedures, control procedures, names, and information including data or parameters may be changed unless otherwise indicated.

Each component in each apparatus is functional and conceptual. Thus, the components are not necessarily arranged as shown in the figures. That is, forms of distribution or integration of apparatuses are not limited to those shown in the figures. The whole or a part of the apparatuses may be distributed or integrated at will according to various loads or usage. In addition, the whole or a part of each process function in each apparatus can be realized by a CPU and a program, or can be realized by wired logic hardware.

The present application contains subject matter related to Japanese patent application No. 2004-105973, filed in the JPO on Mar. 31, 2004, the entire contents of which being incorporated herein by reference.

What is claimed is:

1. A packet processing system including a forwarding apparatus that sends and receives a packet by using a network interface and a control apparatus that includes an application receiving the packet sent from the forwarding apparatus, the control apparatus comprising:

a transfer control part for sending a request message to the forwarding apparatus requesting the forwarding apparatus to set a packet transfer rule for transferring a received packet to the application when detecting that a communication port generated by the application corresponds to a virtual interface corresponding to address information of the forwarding apparatus;

the forwarding apparatus comprising:

a transfer control part for setting the packet transfer rule as requested by the request message;

wherein the packet transfer rule includes an interface identifier corresponding to the communication port; and when the control apparatus detects that the interface identifier is changed, the control apparatus sends a correction message to the forwarding apparatus requesting the forwarding apparatus to correct the interface identifier in the packet transferring rule.

2. The packet processing system as claimed in claim 1, wherein, when the interface identifier in the packet transfer rule is an undecided value, the control apparatus sends the correction message to the forwarding apparatus after the interface identifier is decided.

3. The packet processing system as claimed in claim 1, wherein the forwarding apparatus sets the packet transfer rule in response to the request message, issues a signaling identifier to include the signaling identifier into the packet transfer rule and sends a response message that includes the signaling identifier to the control apparatus.

4. The packet processing system as claimed in claim 3, wherein the control apparatus adds the signaling identifier into the correction message and sends the correction message to the forwarding apparatus.

5. A packet processing system including a forwarding apparatus that sends and receives a packet by using a network interface and a control apparatus that includes an application receiving the packet sent from the forwarding apparatus, the control apparatus comprising:

a transfer control part for sending a request message to the forwarding apparatus requesting the forwarding apparatus to set a packet transfer rule for transferring a received packet to the application when detecting that a communication port generated by the application corresponds to a virtual interface corresponding to address information of the forwarding apparatus;

the forwarding apparatus comprising:

a transfer control part for setting the packet transfer rule as requested by the request message from the control apparatus;

wherein, when a port number corresponding to the communication port is an undecided value, the transfer control part of the control apparatus requests the forwarding apparatus to issue a port number before sending the request message, and the forwarding apparatus issues the port number that is not in use in the forwarding apparatus for the control apparatus by referring to a port number table, and the transfer control part of the control apparatus includes the issued port number into the request message and sends the request message to the forwarding apparatus.

6. The packet processing system as claimed in claim 5, wherein the control apparatus requests the forwarding apparatus to issue the port number by sending, to the forwarding apparatus, an issuing request message including a port undecided value indicating that the port number is undecided, and the forwarding apparatus changes the port undecided value in the issuing request message to a specific port number and sends the changed message as a response message to the control apparatus for issuing the port number for the forwarding apparatus.

7. The packet processing system as claimed in claim 5, wherein the port number table includes a port number, a use status, an identifier of a control apparatus that uses the port number wherein these values are associated with each other.

8. A packet processing method used in a packet processing system including a forwarding apparatus that sends and receives a packet by using a network interface and a control apparatus that includes an application receiving the packet sent from the forwarding apparatus, the packet processing method comprising the steps of:

the control apparatus sending a request message to the forwarding apparatus requesting the forwarding apparatus to set a packet transfer rule for transferring a received packet to the application when the control apparatus detects that a communication port generated by the application corresponds to a virtual interface in the control apparatus, wherein the virtual interface corresponds to address information of the forwarding apparatus; and the forwarding apparatus setting the packet transfer rule as requested by the request message;

wherein the packet transfer rule includes an interface identifier corresponding to the communication port; and when the control apparatus detects that the interface identifier is changed, the control apparatus sends a correction message to the forwarding apparatus requesting the forwarding apparatus to correct the interface identifier in the packet transfer rule.

9. The packet processing method as claimed in claim 8, wherein, when the interface identifier in the packet transfer rule is an undecided value, the control apparatus sends the correction message to the forwarding apparatus after the interface identifier is decided.

10. The packet processing method as claimed in claim 8, wherein the forwarding apparatus sets the packet transfer rule in response to the request message, issues a signaling identifier to include the signaling identifier into the packet transfer rule and sends a response message that includes the signaling identifier to the control apparatus.

11. The packet processing method as claimed in claim 10, wherein the control apparatus adds the signaling identifier into the correction message and sends the correction message to the forwarding apparatus.

12. A packet processing method in a packet processing system including a forwarding apparatus that sends and receives a packet by using a network interface and a control apparatus that includes an application receiving the packet sent from the forwarding apparatus, the packet processing method comprising the steps of:

the control apparatus sending a request message to the forwarding apparatus requesting the forwarding apparatus to set a packet transfer rule for transferring a received packet to the application when the control apparatus detects that a communication port generated by the application corresponds to a virtual interface in the control apparatus, wherein the virtual interface corresponds to address information of the forwarding apparatus; and the forwarding apparatus setting the packet transfer rule as requested by the request message;

wherein, when a port number corresponding to the communication port is an undecided value, the control apparatus requests the forwarding apparatus to issue a port number before sending the request message, and the forwarding apparatus issues the port number that is not in use in the forwarding apparatus for the control apparatus by referring to a port number table, and the control apparatus includes the issued port number into the request message and sends the request message to the forwarding apparatus.

13. The packet processing method as claimed in claim 12, wherein the control apparatus requests the forwarding apparatus to issue the port number by sending, to the forwarding apparatus, an issuing request message including a port undecided value indicating that the port number is undecided, and the forwarding apparatus changes the port undecided value in the issuing request message to a specific port number and sends the changed message as a response message to the control apparatus for issuing the port number for the forwarding apparatus.

14. The packet processing method as claimed in claim 12, wherein the port number table includes a port number, a use status, an identifier of a control apparatus that uses the port number wherein these values are associated with each other.

15. A control apparatus used in a packet processing system including a forwarding apparatus that sends and receives a packet by using a network interface and the control apparatus that includes an application receiving the packet sent from the forwarding apparatus, the control apparatus comprising:

a transfer control part for sending a request message to the forwarding apparatus requesting the forwarding apparatus to set a packet transfer rule for transferring a received packet to the application when detecting that a communication port generated by the application corresponds to a virtual interface corresponding to address information of the forwarding apparatus;

wherein the packet transfer rule generated by the forwarding apparatus includes an interface identifier corresponding to the communication port; and when the control apparatus detects that the interface identifier is changed, the control apparatus sends a correction message to the forwarding apparatus requesting the forwarding apparatus to correct the interface identifier in the packet transfer rule.

16. The control apparatus as claimed in claim 15, wherein, when the interface identifier in the packet transfer rule is an undecided value, the control apparatus sends the correction message to the forwarding apparatus after the interface identifier is decided.

17. A control apparatus used in a packet processing system including a forwarding apparatus that sends and receives a packet by using a network interface and the control apparatus that includes an application receiving the packet sent from the forwarding apparatus, the control apparatus comprising:

a transfer control part for sending a request message to the forwarding apparatus requesting the forwarding apparatus to set a packet transfer rule for transferring a received packet to the application when detecting that a communication port generated by the application corresponds to a virtual interface corresponding to address information of the forwarding apparatus;

wherein, when a port number corresponding to the communication port is an undecided value, the transfer control part of the control apparatus requests the forwarding apparatus to issue a port number before sending the request message, and the transfer control part of the control apparatus includes a port number issued by the forwarding apparatus that is not in use in the forwarding apparatus for the control apparatus by referring to a port number table into the request message and sends the request message to the forwarding apparatus.

18. A program embodied in a computer readable medium for causing a control apparatus to perform processing for packet transmission, wherein the control apparatus is used in a packet processing system including a forwarding apparatus that sends and receives a packet by using a network interface and the control apparatus that includes an application receiving the packet sent from the forwarding apparatus, the program comprising:

program code for sending a request message to the forwarding apparatus requesting the forwarding apparatus to set a packet transfer rule for transferring a received packet to the application when detecting that a communication port generated by the application corresponds to a virtual interface in the control apparatus, wherein the virtual interface corresponds to address information of the forwarding apparatus;

wherein the packet transfer rule generated by the forwarding apparatus includes an interface identifier corresponding to the communication port; and the program further comprising program code for detecting that the interface identifier is changed, and sending a correction message to the forwarding apparatus requesting the forwarding apparatus to correct the interface identifier in the packet transfer rule.

19. The program as claimed in claim 18, the program further comprising program code for, when the interface identifier in the packet transfer rule is an undecided value, sending the correction message to the forwarding apparatus after the interface identifier is decided.

20. A program embodied in a computer readable medium for causing a control apparatus to perform processing for packet transmission, wherein the control apparatus is used in a packet processing system including a forwarding apparatus that sends and receives a packet by using a network interface and the control apparatus that includes an application receiving the packet sent from the forwarding apparatus, the program comprising:

program code for sending a request message to the forwarding apparatus requesting the forwarding apparatus to set a packet transfer rule for transferring a received packet to the application when detecting that a communication port generated by the application corresponds to a virtual interface in the control apparatus, wherein the virtual interface corresponds to address information of the forwarding apparatus; and program code for, when a port number corresponding to the communication port is an undecided value, requesting the forwarding apparatus to issue a port number before sending the request message, and including a port number issued by the forwarding apparatus that is not in use in the forwarding apparatus for the control apparatus by referring to a port number table into the request message and sending the request message to the forwarding apparatus.

\* \* \* \* \*